US012244697B2

(12) United States Patent
Deshpande et al.

(10) Patent No.: US 12,244,697 B2
(45) Date of Patent: Mar. 4, 2025

(54) SYSTEM AND METHOD FOR IDENTITY-BASED KEY AGREEMENT FOR SECURE COMMUNICATION

(71) Applicant: FORTYTWO42 LABS LLP, Pune (IN)

(72) Inventors: Sanjay Deshpande, Pune (IN); Anil Kumar Pradhan, Barihapur (IN)

(73) Assignee: FORTYTWO42 LABS LLP, Pune (IN)

( * ) Notice: Subject to any disclaimer, the term of this patent is extended or adjusted under 35 U.S.C. 154(b) by 202 days.

(21) Appl. No.: 17/926,500

(22) PCT Filed: Jul. 21, 2021

(86) PCT No.: PCT/IN2021/050708
§ 371 (c)(1),
(2) Date: Nov. 18, 2022

(87) PCT Pub. No.: WO2022/185328
PCT Pub. Date: Sep. 9, 2022

(65) Prior Publication Data
US 2023/0188330 A1 Jun. 15, 2023

(30) Foreign Application Priority Data
Mar. 2, 2021 (IN) .............................. 202121008721

(51) Int. Cl.
*H04L 9/08* (2006.01)
*H04L 9/32* (2006.01)
(52) U.S. Cl.
CPC ............ *H04L 9/085* (2013.01); *H04L 9/0847* (2013.01); *H04L 9/3215* (2013.01)

(58) Field of Classification Search
None
See application file for complete search history.

(56) References Cited

U.S. PATENT DOCUMENTS

| | | | |
|---|---|---|---|
| 7,809,946 B2 | 10/2010 | Durand et al. | |
| 9,100,186 B2 * | 8/2015 | O'Hare | G06F 21/6218 |
| 9,106,410 B2 | 8/2015 | Sundaram | |
| 9,813,243 B1 * | 11/2017 | Triandopoulos | H04L 63/061 |
| 9,813,244 B1 * | 11/2017 | Triandopoulos | H04L 63/061 |
| 10,084,596 B1 * | 9/2018 | Triandopoulos | H04L 9/085 |
| 10,511,436 B1 * | 12/2019 | Machani | H04L 9/085 |
| 2019/0332792 A1 * | 10/2019 | Kunii | G06F 21/6218 |
| 2021/0167947 A1 * | 6/2021 | Chung | H04L 9/3268 |
| 2022/0094526 A1 * | 3/2022 | Irazabal | H04N 21/26613 |

FOREIGN PATENT DOCUMENTS

EP 2399361 B1 3/2020

OTHER PUBLICATIONS

International Search Report and Written Opinion for related International Application No. PCT/IN2021/050708 mailed Nov. 9, 2021.

* cited by examiner

*Primary Examiner* — Jeffrey R Swearingen
(74) *Attorney, Agent, or Firm* — Renner, Otto, Boisselle & Sklar, LLP

(57) ABSTRACT

The present invention provides a method and system for secure communication over communication network by an identity-based key agreement between the parties transmitting information over the network. The system and method there of employs (k, n) threshold secret sharing scheme and assures information theoretic secrecy that cannot be broken by unlimited computing power.

20 Claims, 8 Drawing Sheets

SYSTEM AND METHOD FOR IDENTITY-BASED KEY AGREEMENT FOR SECURE COMMUNICATION

This application is a national phase of International Application No. PCT/IN2021/050708 filed 21 Jul. 2021, which claims priority to India application No. 202121008721 filed 2 Mar. 2021, the entire disclosures of which are hereby incorporated by reference.

FIELD OF THE INVENTION

The present invention generally relates to Information technology and more particularly relates to a system and method for secure communication between two or more parties over a communication network.

BACKGROUND OF THE INVENTION

Currently, the classical internet channel has been widely used to send sensitive data across the globe. Since, such communication services through the Internet is widespread, security on the network is also a salient feature that should be considered solemnly. The provision of sending simple information through the Internet as well as the services like electronic commercial and Internet banking has increased, the demand for technology for securely delivering important information on the Internet also has gradually increased. The internet channel has major issues related to openness, no privacy and authenticity, the data sent across internet can be viewed by multiple parties who are not intended to, and they can make a copy of it. Further the network provides undetected interference or poor integrity on the data sent over it. People can make alteration or modify the data and the sender or receiver will not be able to obtain any knowledge about it.

In order to achieve security against these issues, sender encrypts the data before sending through the internet channel and receiver decrypts the data after receiving. Encryption algorithms like AES are used to encrypt/decrypt the data. For successful encryption and decryption, both sender and receiver must have the knowledge of the same key (or key pair for asymmetric encryption). This is done by key exchange applications like Diffie-Hellman, Elliptic Curve Diffie-Hellman and Identity-based Encryption etc. Such applications are always prone to the man-in-the-middle attack. As there are no steps for identity verification, the communicating entities do not really know who they are communicating with. These algorithms are based on mathematical hard problems that can be solved by quantum computers.

To overcome this and make secure communication work, an authenticated key agreement technique is introduced where multiple participants, authenticate each other and agree on a key for future communication. Each communicating party must authenticate each other's identity. This is usually done using a combination of digital signature and digital certificate. The certificate binds the identity and the public key. The public key is used to verify the signature made using the corresponding private key. The steps involved in this technique are
  authentication where the system provides the user an identity.
  a key agreement that forms a shared secret key which will be used for encryption/decryption for the session, and encryption, where, all the information will be encrypted with the computed key before sharing on public channel.

However, the techniques in the existing art are found to be deficient in many ways. The digital signature and key agreement algorithms (e.g. Diffie-Hellman and Elliptic Curve Cryptography) are built on the top of some mathematical problems like prime factorization, discrete logarithm, that are practically impossible to solve using most powerful classical computers. But the hard problems like discrete logarithm, elliptic curve discrete logarithm or prime factorization are found to be vulnerable to quantum attacks. Advances and development of faster computing technology makes this kind of algorithm vulnerable and forces continuous improvement. These hard problems can be easily solved using quantum computers using quantum algorithms and hence can break the key exchange algorithms. For example, Shor's Algorithm can easily solve prime factorization using a quantum computer and hence break RSA algorithm. Thus, an attacker can get the key during the key exchange procedure and decrypt all the information communicated post to that process.

The key agreement algorithms are not linked to the identity of the entities. So, the identity authentication is done separately using digital signature algorithms. But, the missing link between identity and cryptography makes the system inconsistent. Without identity authentication the key agreement has no meaning as both the entities do not get to know who they are communicating with. Authentication and key agreement should be tightly bound, which is not there in the existing algorithms.

Accordingly, there exists a need to provide a system for secure communication between two or more parties over a communication network that can overcome the drawbacks of prior art techniques.

For the reasons stated above, which will become apparent to those skilled in the art upon reading and understanding the specification, there is a need in the art for a system and method thereof for secure communication between two or more parties over a communication network where authentication and key agreement are tightly bound that is useable, scalable and independent of new technology platforms, uses minimum resources that is easy and cost effectively maintained and is portable and can be deployed anywhere in very little time.

OBJECTS OF THE INVENTION

An object of the present invention is to provide highly secured communication over internet that cannot be broken by any technology having large computing power.

Another object of the present invention is to authenticate the identity of the parties before starting communication and generate a secret shared key between the parties involved in the communication.

Yet another object of the invention is to provide a missing link between identity and cryptography for secured communication over internet.

SUMMARY OF THE INVENTION

The present invention provides a method and system for secure communication over communication network by an identity-based key agreement between the parties transmitting information over the network. The system and method there of employs (k, n) threshold secret sharing scheme and assures information theoretic secrecy that cannot be broken by unlimited computing power like quantum computers.

The invention discloses a method for secure communication between two or more parties over a communication network. The method of the present invention includes steps of communicating, in agreement over a communication channel the threshold number of shares 'k' required to reconstruct the secret information, communicating, in agreement over a communication channel the total number of shares 'n' in which the identity of each party/device shall be divided such that n=2 (k−1), establishing, an initial encryption/decryption key $K_F$ in agreement with all the parties/devices, at all the parties/devices involved in communication by communicating the key $K_F$ over a communication channel or over an out of band communication channel or by offline means, to all the parties/devices involved in communication. The method further includes step of establishing, in broadcast mode or communication mode, a pre-shared information (PSI) at each of the party/device in the communication. The method subsequently includes steps of generating, shared secret key, by receiving exchange key by one party/device in communication from other party/device in communication and reconstructing the secret from the shares and exchange key received and verifying shared key, by generating the hash values by applying hash function to the set of shared key and the random value at each party/device in the communication, communicating the generated hash value and the random value from each party/device in communication to other party/device in communication, generating the hash values by applying hash function to the set of shared key and the received random value from other communicating device and comparing the resultant hash value with that of the received hash value from other communication device. Further, the method includes step of updating, pre-shared information in static secret value mode or dynamic secret value mode after each key agreement.

The system of the present invention for secure communication between two or more parties over a communication network comprises a first party/device capable of communicating over a network, the first party/device comprises at least one processor, the first processor, at least one memory communicatively coupled to the first processor and at least one communication management module capable of managing transceiver activity and communicatively coupled to the first processor, at least one other party/device capable of communicating over a network, the other party/device comprises at least one processor, the other processor, at least one memory communicatively coupled to the other processor and at least one communication management module capable of managing transceiver activity and communicatively coupled to the other processor, and a network for facilitating a communication channel between the first party/device and the at least one other party/device.

According to the system of present invention, the first processor of the first party/device is configured to communicate over the communication channel, a threshold number of shares 'k' required to reconstruct the secret information, communicate over the communication channel, the total number of shares 'n' in which the identity of first party/device shall be divided such that n=2(k−1), establish an encryption/decryption key, establish, in broadcast mode or communication mode, a pre-shared information (PSI) at first party/device, obtain, shared key, by receiving exchange key by first party/device from other party/device and reconstructing the secret from the shares and exchange key received, verify shared key, by generating the hash values by applying hash function to the set of shared key and the random value at first party/device, communicate the generated hash value and the random value from first party/device in communication to other party/device, generate the hash values by applying hash function to the set of shared key and the received random value from other party/device and compare the resultant hash value with that of the received hash value from other party/device, and update pre-shared information at first party/device in static secret value mode or dynamic secret value mode after each key agreement.

According to the system of present invention, the other processor of the other party/device is configured to communicate over the communication channel, a threshold number of shares 'k' required to reconstruct the secret information, communicate over the communication channel, the total number of shares 'n' in which the identity of other party/device shall be divided such that n=2(k−1), establish an encryption/decryption key, establish, in broadcast mode or communication mode, a pre-shared information (PSI) at other party/device, obtain, shared key, by receiving exchange key by other party/device from first party/device and reconstructing the secret from the shares and exchange key received, verify shared key, by generating the hash values by applying hash function to the set of shared key and the random value at other party/device, communicate the generated hash value and the random value from other party/device to first party/device, generate the hash values by applying hash function to the set of shared key and the received random value from first party/device and compare the resultant hash value with that of the received hash value from first party/device, and update pre-shared information at other party/device in static secret value mode or dynamic secret value mode after each key agreement.

BRIEF DESCRIPTION OF THE DRAWINGS

The embodiments can be better understood with reference to the following drawings and description. The components in the figures are not necessarily to scale, the emphasis instead being placed upon illustrating the principles of the embodiments. Moreover, the figures, like reference numerals designate corresponding parts throughout the different views.

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure 1:
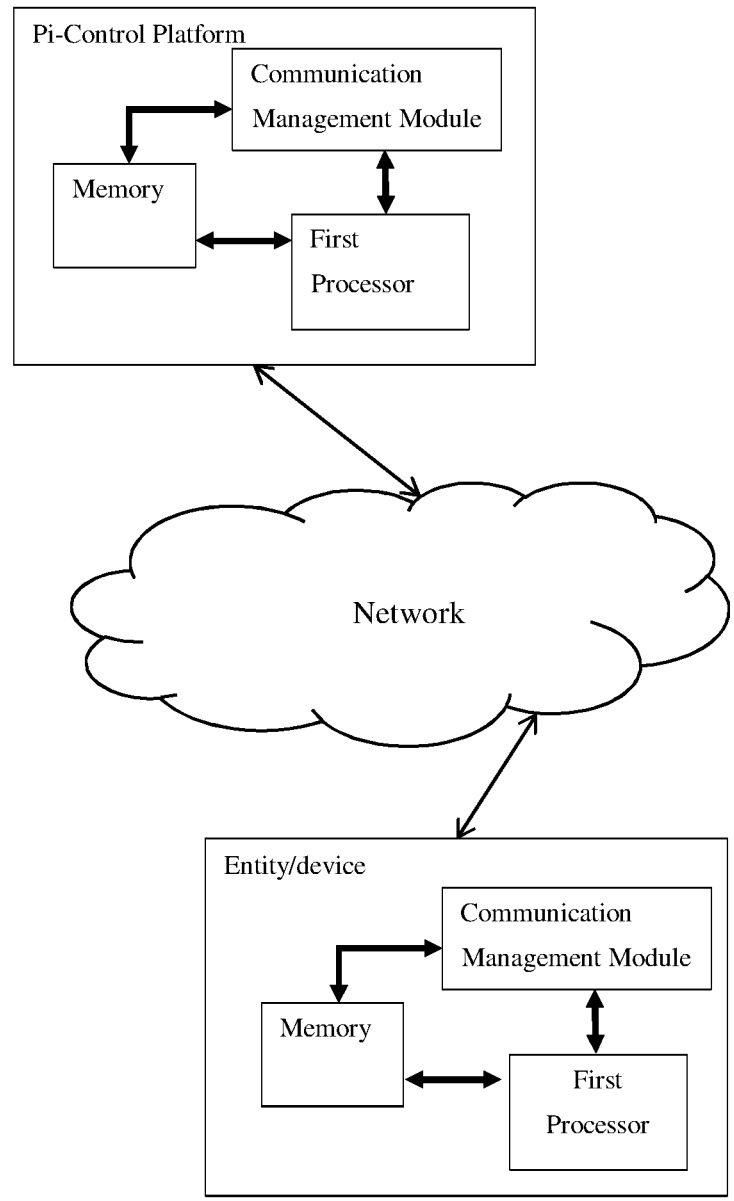

The above and other objects, features, and advantages of the present invention will be more clearly understood from the following detailed description taken in conjunction with the accompanying drawings, in which:

FIG. 1 shows a block representation of a system for secure communication between two or more parties over a communication network according to one of the embodiment of the present invention.

Figure 2:
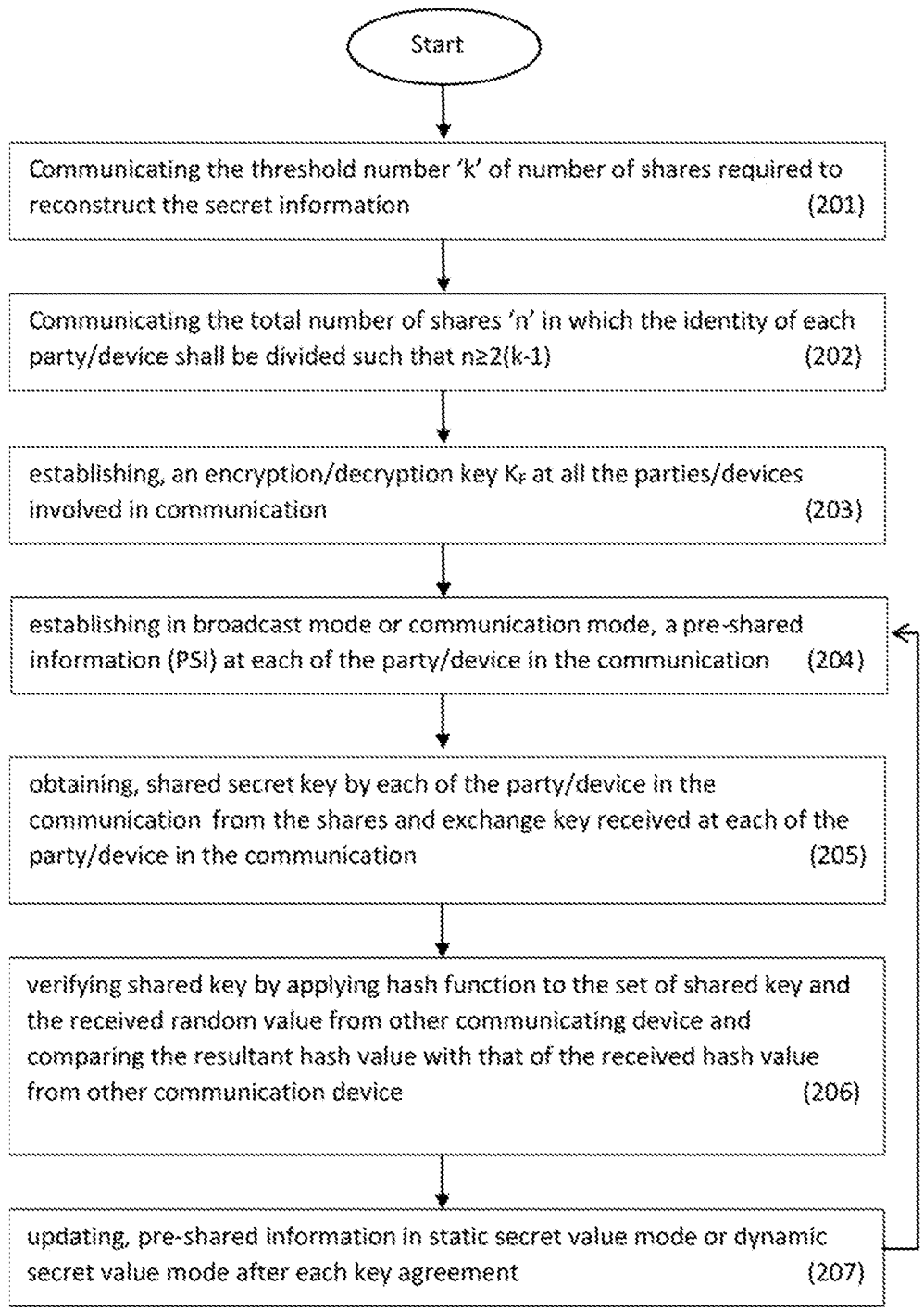

FIG. 2 illustrates a flow diagram of the method for secure communication between two or more parties over a communication network according to one of the embodiment of the present invention.

Figure 3:
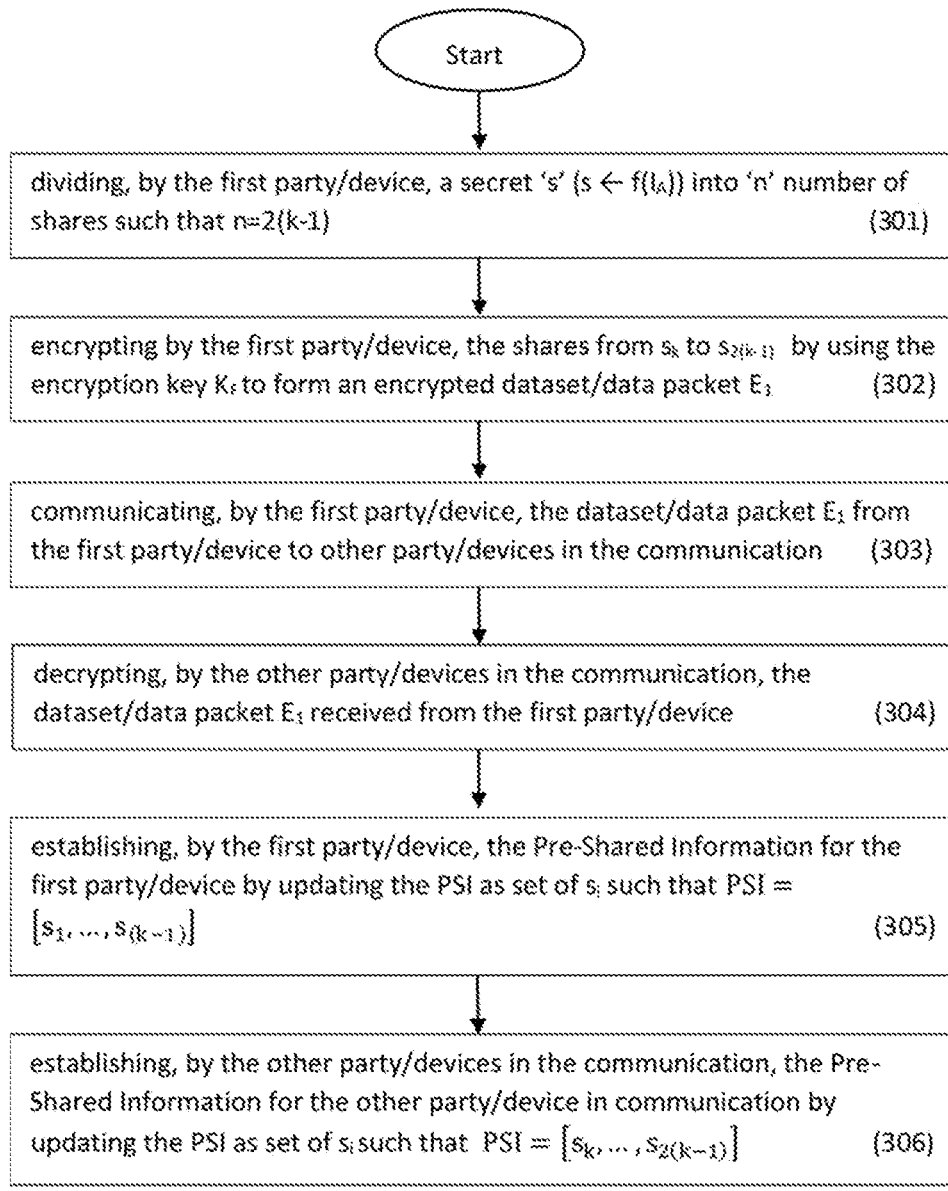

FIG. 3 illustrates a flow diagram of the method step of establishing, in broadcast mode a pre-shared information (PSI) at each of the party/device in the communication according to one of the embodiment of the present invention.

Figure 4:
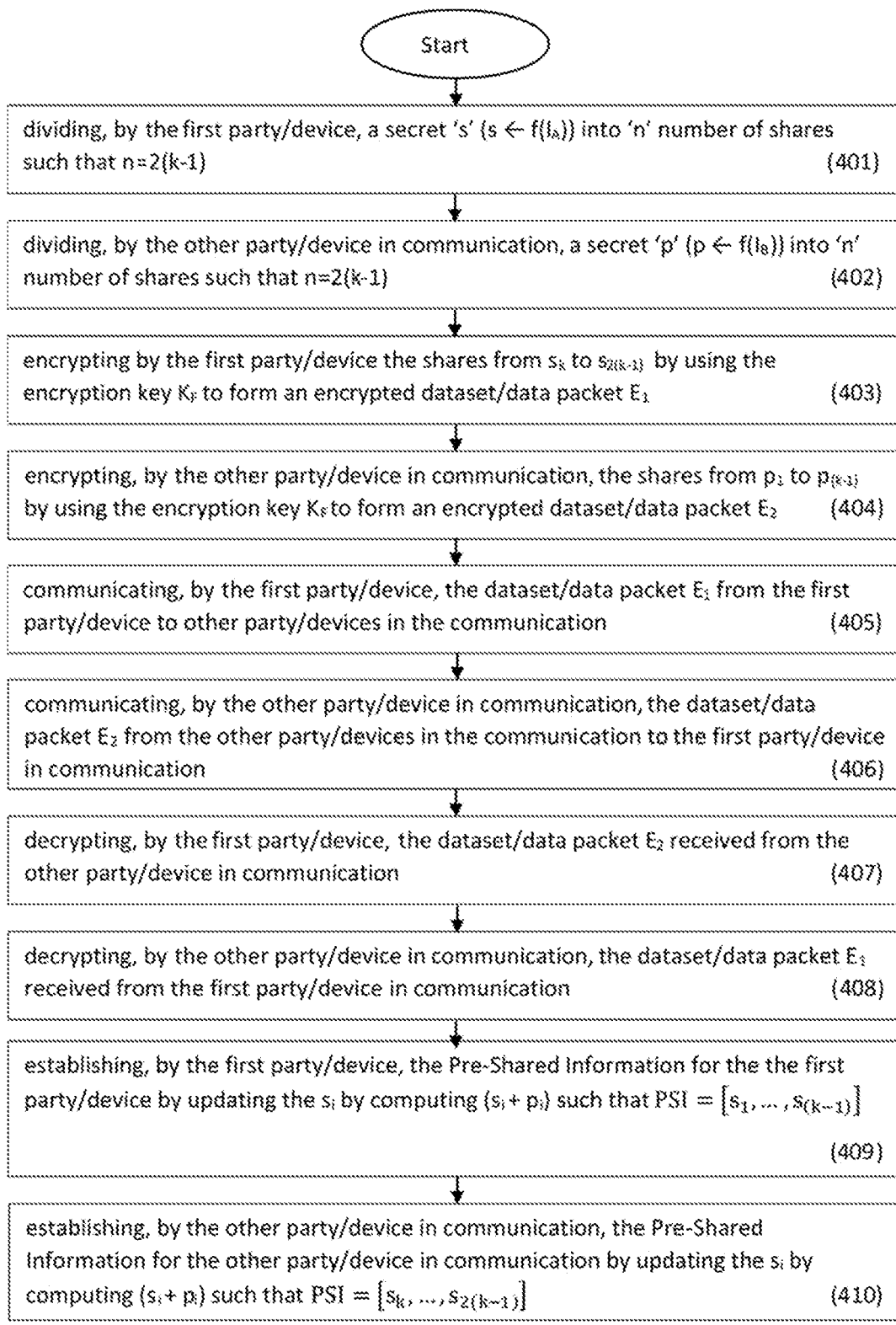

FIG. 4 illustrates a flow diagram of the method step of establishing, in communication mode a pre-shared information (PSI) at each of the party/device in the communication according to one of the embodiment of the present invention.

Figure 5:
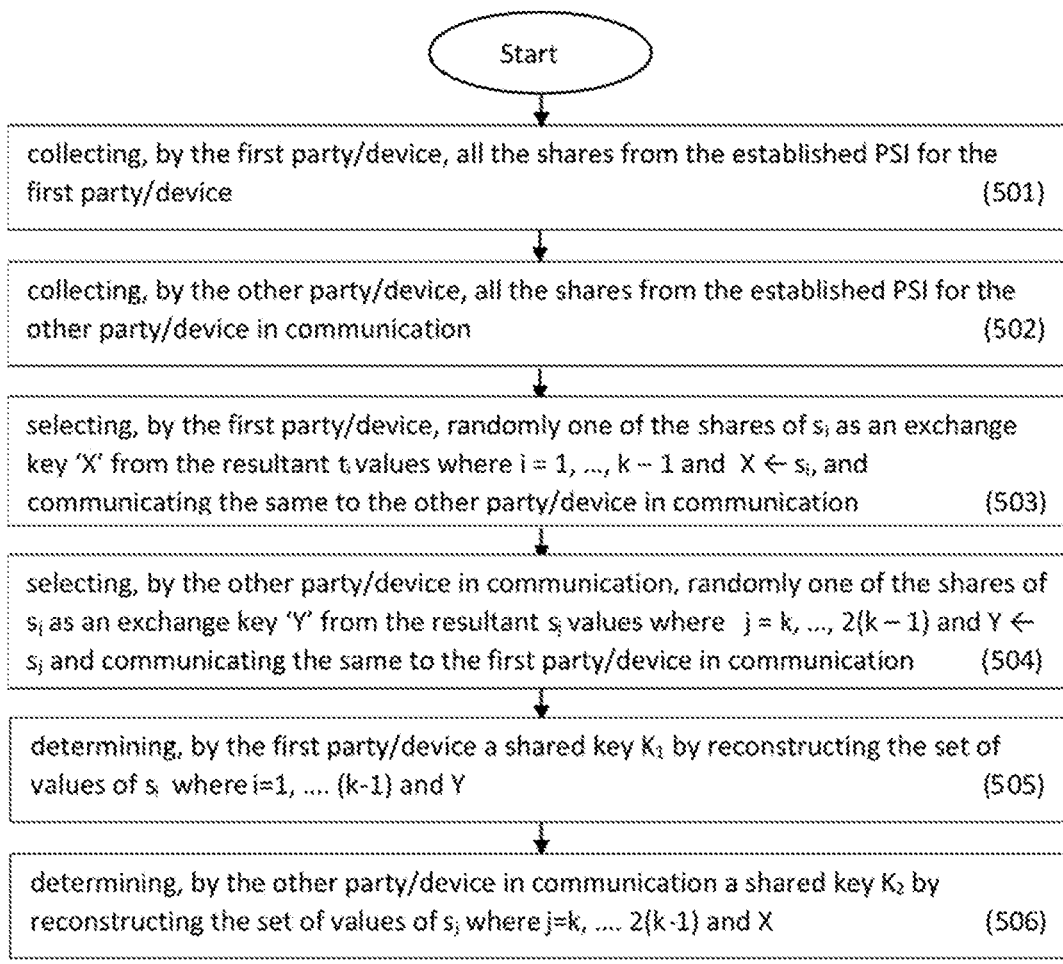

FIG. 5 illustrates a flow diagram of the method step of obtaining shared key at each of the party/device in the communication according to one of the embodiment of the present invention.

Figure 6:
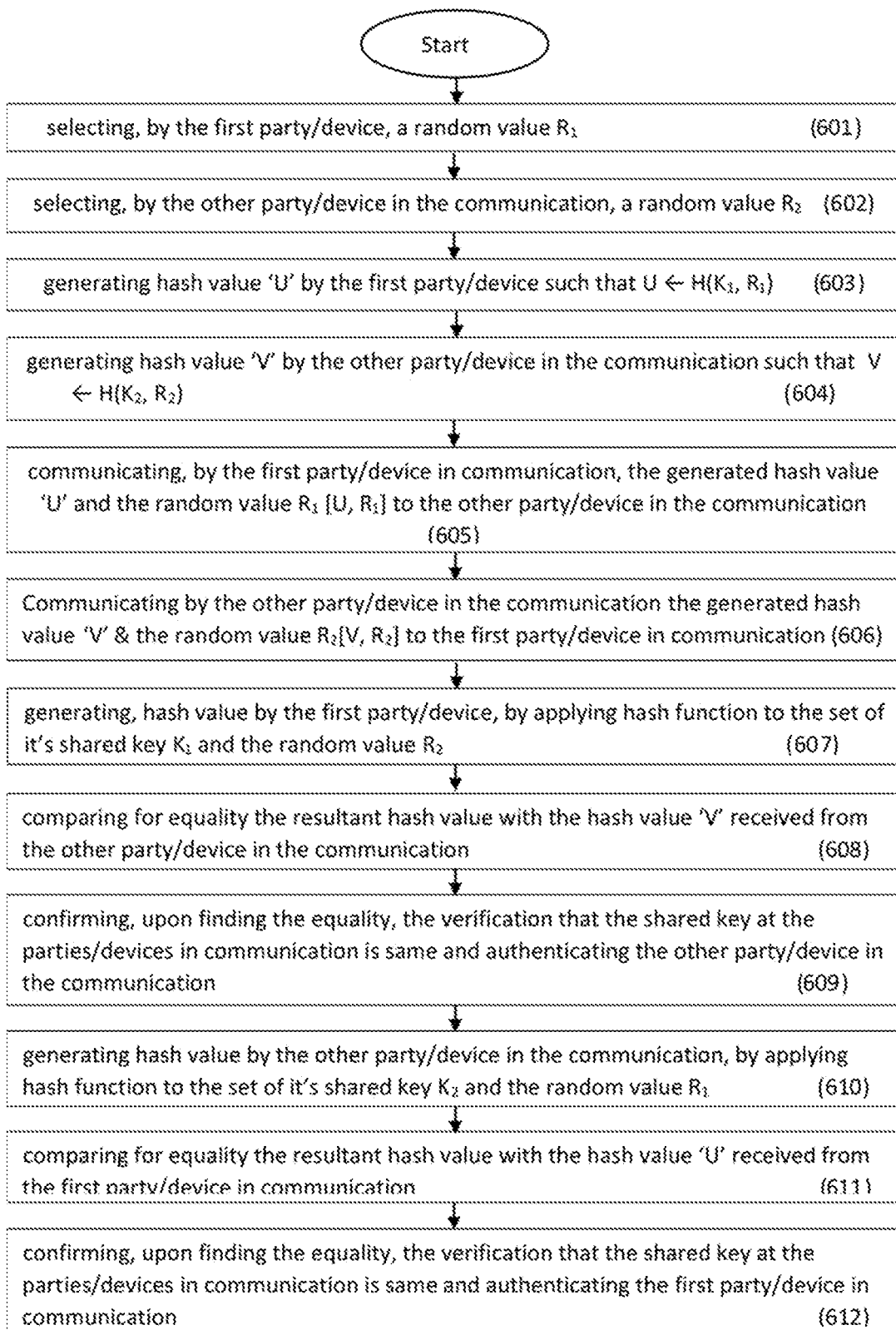

FIG. 6 illustrates a flow diagram of the method step of verifying shared key at each of the party/device in the communication according to one of the embodiment of the present invention.

Figure 7:
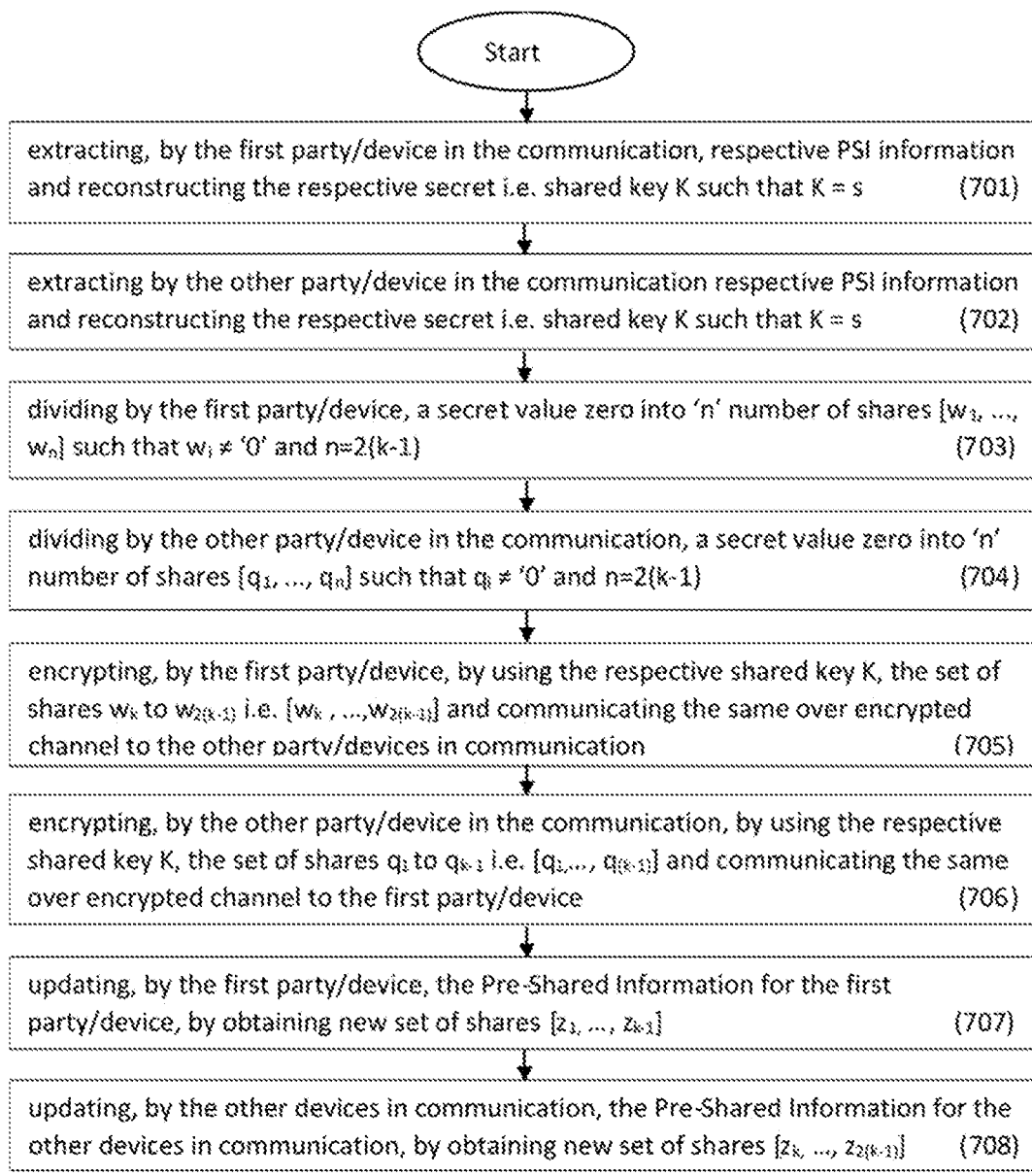

FIG. 7 illustrates a flow diagram of the method step of updating pre-shared information in static secret value mode at each of the party/device in the communication according to one of the embodiment of the present invention.

Figure 8:
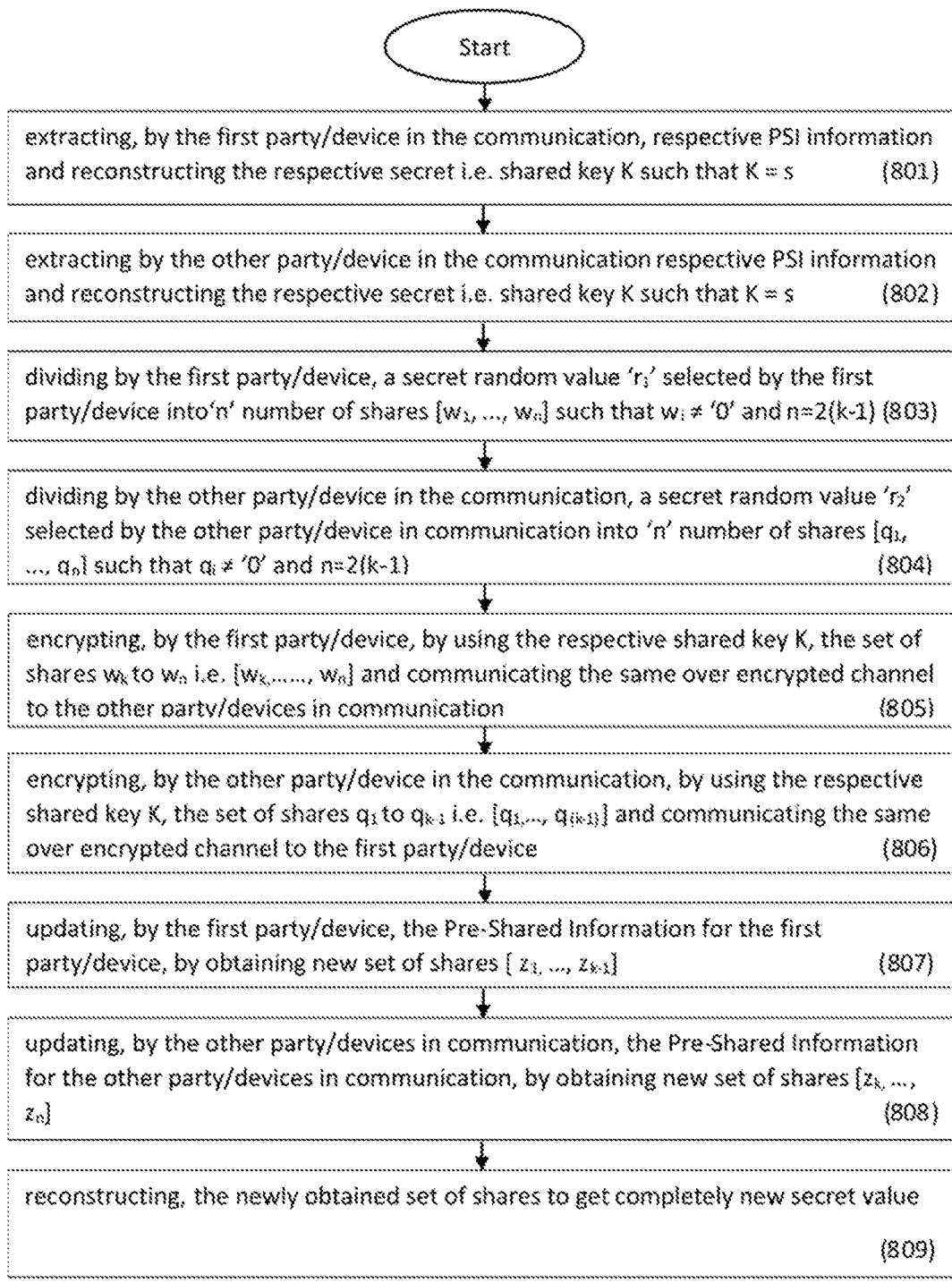

FIG. 8 illustrates a flow diagram of the method step of updating pre-shared information in dynamic secret value mode at each of the party/device in the communication according to one of the embodiment of the present invention.

DETAILED DESCRIPTION OF THE INVENTION

The foregoing objects of the present invention are accomplished and the problems and shortcomings associated with the prior art, techniques and approaches are overcome by the present invention as described below in the preferred embodiments.

The present invention is a method and system for secure communication over communication network by an identity-based key agreement between the parties transmitting information over the network.

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

The various embodiments of the present invention provide a method and system for secure communication over communication network by an identity-based key agreement between the parties transmitting information over the network.

Furthermore, connections between components and/or modules within the figures are not intended to be limited to direct connections. Rather, these components and modules may be modified, re-formatted or otherwise changed by intermediary components and modules.

The systems/device and methods described herein are explained using examples with specific details for better understanding. However, the disclosed embodiments can be worked on by a person skilled in the art without the use of these specific details.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the present invention to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

Embodiments of the present invention include various steps, which will be described below. The steps may be performed by hardware components or may be embodied in machine-executable instructions, which may be used to cause a general-purpose or special purpose processor programmed with the instructions to perform the steps. Alternatively, steps may be performed by a combination of hardware, software, firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

In some embodiments, the systems may be configured as a distributed system where one or more components of the system are distributed across one or more networks in a cloud computing system.

If the specification states a component or feature "may' can", "could", or "might" be included or have a characteristic, that particular component or feature is not required to be included or have the characteristic.

As used in the description herein and throughout the claims that follow, the meaning of "a, an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Hereinafter, embodiments will be described in detail. For clarity of the description, known constructions and functions will be omitted. Parts of the description may be presented in terms of operations performed by an Electrical/Electronic system, using terms such as state, link, ground, fault, packet and the like, consistent with the manner commonly employed by those skilled in the art to convey the substance of their work to others skilled in the art. As is well understood by those skilled in the art, these quantities take the form of data stored/transferred in the form of electrical, magnetic, or optical signals capable of being stored, transferred, combined, and otherwise manipulated through mechanical and electrical components of the electronic/electrical systems; and the term electronic/electrical/computer system includes general purpose as well as special purpose data processing machines, switches, and the like, that are standalone, adjunct or embedded.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

The present invention provides a method and system for secure communication over communication network by an identity-based key agreement between the parties transmitting information over the network. The system and method there of employs (k, n) threshold secret sharing scheme and assures information theoretic secrecy that cannot be broken by unlimited computing power. Hence, the confidentiality of communication is not vulnerable to any future development to computing power such as quantum computing.

Referring to the FIGS. 1 and 2, a system for identity-based key agreement for a secure communication (100) ("the system (100)" hereinafter) is shown, in accordance with the present invention. The system (100) comprises a first communication device operably connected to a plurality of communication devices through a communication network server ("server" hereinafter).

In an implementation, according to one of the embodiments of the present invention the first communication device (Pi-Control Platform) comprises a processing unit connected to an input unit, an output unit and a memory unit through a plurality of interfacing circuits. Similarly, the communication network server and each of the plurality of communication devices in the network also having a processing unit interfaced with input unit, output unit and memory unit. The processing unit includes a plurality of integrated circuits, or chips, that are designed to work in accordance with a set of instructions configured within an internal memory. The memory unit in the server is configured with an application module that supports real-time communication and control of resources in the communication network.

The server resources shared by the plurality of communication devices include the memory and the network accessibility.

The first communication device (Pi-Control Platform) includes desktop computer, laptop computers, mobile devices, handheld electronic devices, Internet of Things (IoT), and like. The first communication device is configured with an application module that provides a secure communication between the first and a second communication device among the plurality of communication devices over the communication network.

In the embodiment, the first communication device is used by a first party 'Pi-Control Platform' and the second communication device is used by a second party 'Entity'. The processor of the communication device having application module configured in the processor initiates through a communication module having configured in the processor a secured communication between the parties over the communication network. The secure communication occurs between the parties by establishing an identity based authenticated key agreement between the first and second communication devices or the parties involved in the communication process.

Again, referring to the FIGS. 1 and 2, a method of identity-based key agreement for a secure communication is described in accordance with the present invention. The method is described in conjunction with the system (100).

In an implementation according to one of the embodiment of the present invention in secure communication, a secret sharing scheme splits the secret information or cryptographic key (which represents the identity of the entity in this case) split into multiple parts called shares '$s_i$'. Let the number of shares be 'n'. These shares again used to reconstruct the original secret information. There is a minimum number of shares called threshold 'k' required to reconstruct the secret information.

Knowledge of any 'k' or more shares makes secret easily computable, and knowledge of any 'k−1' or fewer shares makes 's' completely undetermined.

In particular the (k, n) threshold secret sharing scheme splits the secret information into 'n' number of shares such that in order to reconstruct the secret information at least 'k' number of shares are needed. Where, 'n'='k'. Any set of less than 'k' number of shares will not give any clue about the secret information.

According to one of the embodiments, in the method of the present invention the identity based key agreement involves an identity-based authenticated key agreement. The stages involved in the method are as follows.

According to one of the embodiment, the method of the present invention, includes a setup stage as the first stage. In the first stage, the setup stage, the parties involved in the communication process, establish a pre-shared information (PSI) with each other based on their identity.

For example, the first party (Pi-Control Platform) and the second party (Entity) with identities $I_A$ and $I_B$ respectively, initiate a setup process. The setup process for establishing a pre-shared information (PSI) at each of the party/device in the communication can be performed in broadcast mode or communication mode.

According to one of the embodiments of the present invention the setup process for establishing a pre-shared information (PSI) at each of the party/device in the communication is performed in the broadcast mode wherein the identity of one of the party/device in communication is used as the secret and splits the secret into shares, the shares are encrypted and communicate partial number of shares with other party/device in communication to establish a pre-shared information (PSI) at each of the party/device in the communication. The steps involved in the process are given in the following table 1:

TABLE 1

| Pi-Control Platform ($I_A$) | Channel | Entity ($I_B$) |
|---|---|---|
| threshold k ≥ 3, number of shares<br>n = 2(k − 1)<br>Establish Key $K_F$ offline or out of the band.<br>Secret:<br>s ← f($I_A$)<br>(Here f( ) is a cryptographic one-way hash function e.g. SHA256)<br>[$s_1$, . . . , $s_n$] ← Split(s, k, n)<br>$E_1$<br>← Encrypt([$s_k$, . . . , $s_{2(k−1)}$], $K_F$)<br>(Encrypt the information<br>[$s_k$, . . . , $s_{2(k−1)}$] using key $K_F$)<br>PSI = [$s_1$, . . . , $s_{k−1}$] | $E_1$ → | threshold k ≥ 3 number of shares<br>n = 2(k − 1)<br>Establish Key $K_F$ offline or out of the band.<br>[$s_k$, . . . , $s_2(k − 1)$] ←<br>Decrypt($E_1$, $K_F$)<br><br><br><br><br><br>PSI = [$s_k$, . . . , $s_{2(k−1)}$] |
| Setup Complete<br>Pre-shared Information is established at all entities. | | |

Here, in this process, the selection of threshold 'k' and number of shares 'n' can be generalized to numbers satisfying conditions: k≥3, n=2(k−1)

According to one of the embodiments of the present invention the setup process for establishing a pre-shared information (PSI) at each of the party/device in the communication is performed in the communication mode wherein the each party/device in communication uses its own identity as secret and splits the secret into shares, encrypts the shares and communicate partial number of shares with other party/device in communication. Thus each device in communication receives partial number of shares from other party/device in communication that is used to establish a pre-shared information (PSI) at respective party/device. The steps involved in the process are given in the following table 2:

TABLE 2

| Pi-Control Platform ($I_A$) | Channel | Entity ($I_B$) |
|---|---|---|
| threshold k ≥ 3, number of shares n = 2(k − 1) Establish Key $K_F$ offline or out of the band. Secret: s ← f($I_A$) [$s_1, \ldots, s_n$] ← Split(s, k, n) $E_1$ ← Encrypt([$s_k, \ldots, s_{2(k-1)}$], $K_F$) | | threshold k ≥ 3 number of shares n = 2(k − 1) Establish Key $K_F$ offline or out of the band. Secret: p ← f($I_B$) [$p_1, \ldots, p_n$] ← Split(p, k, n) $E_2$ ← Encrypt([$p_1, \ldots, p_{(k-1)}$], $K_F$) |
| | $E_1 \rightarrow$ $\leftarrow E_2$ | |
| [$p_1, \ldots, p_{(k-1)}$] ← Decrypt($E_2$, $K_F$) Generate: $s_i$ ← ($s_i + p_i$), i = 1, \ldots, k − 1 PSI = [$s_1, \ldots, s_{(k-1)}$] | | [$s_k, \ldots, s_{2(k-1)}$] ← Decrypt($E_1$, $K_F$) Generate: $s_i$ ← ($s_i + p_i$), i = k, \ldots, 2(k − 1) PSI = [$s_k, \ldots, s_{2(k-1)}$] |
| Setup Complete Pre-shared Information is established at all entities. | | |

Here, in this process, the selection of threshold 'k' and number of shares 'n' can be generalized to numbers satisfying conditions: k≥3, n=2(k−1)

According to one of the embodiment, the method of the present invention, includes a key agreement stage as the next stage to the setup stage. The key agreement stage includes a shared key obtaining stage and a shared key verification stage.

In an implementation, according to one of the embodiments of the present invention at the shared key obtaining stage, each of the party exchanges information with each other. Based on the exchanged information, each party generates a shared secret key. Further, at the shared key verification stage both the parties verify that each party has generated the same secret key. This is equivalent to authenticating each other.

In the shared key obtaining step each party exchanges some dynamic ephemeral information to each other, based on which each will generate the shared secret key.

a. Each party randomly picks one share from the PSI file and call it "exchange key".

b. The exchange key is shared to other party.

c. Each party reconstructs the secret from the existing shares and received exchange key.

d. The obtained secret is the shared key K.

The steps involved in the process are given in the following table 3:

TABLE 3

| Pi-Control Platform ($I_A$) | Public Channel | Entity ($I_B$) |
|---|---|---|
| PSI = [$s_1, \ldots, s_{k-1}$] X ← $s_1$ | X → ← Y | PSI = [$s_k, \ldots, s_{2(k-1)}$] Y ← $s_k$ |
| Reconstruct I-AM Crypto-ID $K_1$ ← Reconstruct[$s_1, \ldots, s_{k-1}$, Y] $K_1$ = f($I_A$) + f($I_B$) | | Reconstruct I-AM Crypto-ID $K_2$ ← Reconstruct[$s_k, \ldots, s_{2(k-1)}$, X] $K_2$ = f($I_A$) + f($I_B$) |
| Shared Secret Key: K = $K_1$ = $K_2$ This key can be used for encrypting the channel i.e. all the communicated messages. | | |

In the shared key verification stage both the parties verify that each party has generated the same secret key. This is equivalent to authenticating each other. Each party needs to verify that the other party has actually generated the same secret key. This is done using a method based on cryptographic hash functions. One of the methods is discussed as follows: The steps involved in one of the method are given in the following table 4:

Suppose H( ) is a cryptographic hash function.

TABLE 4

| Pi-Control Platform ($I_A$) | Channel | Entity ($I_B$) |
|---|---|---|
| Shared Secret: $K_1$ $R_1$ ← Random( ) U ← H($K_1$, $R_1$) | | Shared Secret: $K_2$ $R_2$ ← Random( ) V ← H($K_2$, $R_2$) |
| | [U, $R_1$] → ← [V, $R_2$] | |
| Verify: H($K_1$, $R_2$) = V | | Verify: H($K_2$, $R_1$) = U |

If the verification steps at both ends become successful, then it is concluded that both the parties have obtained the same secret. This means both parties have authenticated each other.

According to one of the embodiments of the present invention, the secret key thus shared can only be generated exclusively by those two entities involved in the above mentioned processes. Any party reading the communicated information cannot obtain the secret key since only two shares are available in the public channel and there is a need of at least k (k>=3) shares to reconstruct the secret. The key (K) thus generated can further be used for private communications. That means, the Entity can use this key to encrypt the messages, they want to send and the receiver can use this message to decrypt the received encrypted messages.

In an implementation according to one of the embodiments of the present invention in the next stage, updating of pre-shared information occurs. After generating the shared secret key both the parties update the pre-shared information that will be used in the next round. The pre-shared information is updated after each key agreement wherein pre-shared information is updated after each key agreement in static secret value mode or dynamic secret value mode.

In every key agreement process, a new set of shares are used and invalidate the old shares, but with no need of reconstructing the value of the secret. The updating of the shares in the PSI after each key agreement has been done to prevent any intrusion from an outsider due to the exposure of the shares to the public during the key agreement process. Two methods are adapted for updating the Pre-shared Information. The information exchanged during these processes is encrypted using the generated secret key.

For updating the pre-shared information (PSI) two methods are adopted based on the situation. A first method, static secret value mode, is adopted when the parties involved in the communication and the value of the secret are static. A second method, dynamic secret value mode, is adopted when the parties involved in the communication changes the secret or the secret value is dynamic.

a. The first method, static secret value mode, comprises updating of the shares 's' in the PSI without affecting the value of the secret, such that in the next key agreement process the shares will be completely new, but each party will generate the same old secret value for shared key. The parties can modify the shares without altering the resulting secret or needing to regenerate the shares from the beginning. This has been used for updating existing PSI stored at each party just after the key agreement process done. So, the previous shares would not be valid for the next key exchange process.
   a) Each party will create shares for secret value zero called "zero shares"
   b) Shares are exchanged to other party as given in the table.
   c) Then each party updates the shares by adding the zero shares.

TABLE 5

| Pi-Control Platform ($I_A$) | Public Channel | Entity ($I_B$) |
|---|---|---|
| Existing Pre-shared Information | | Existing Pre-shared Information |
| PSI = $[s_1, \ldots, s_k]$ | | PSI = $[s_k, \ldots, s_{2(k-1)}]$ |
| Reconstructed Secret | | Reconstructed Secret |
| K = $f(I_A) + f(I_B)$ | | K = $f(I_A) + f(I_B)$ |
| | Encrypted Channel: Now onwards all messages to be exchanged will be encrypted using K as encryption/decryption key | |
| $[w_1, \ldots, w_n]$ ← Split(0, k, n) | $[wk, \ldots, w2(k-1)]$ → ← $[q_1, \ldots, q_{k-1}]$ | $[q_1, \ldots, q_n]$ ← Split(0, k, n) |
| Update Shares: | | Update Shares: |
| PSI = | | PSI = |
| $[(s_1 + w_1 + q_1), \ldots,$ | | $[(s_k + w_k + q_k), \ldots,$ |
| $(s_{k-1} + w_{k-1} + q_{k-1})]$ | | $(s_{2(k-1)} + w_{2(k-1)} + q_{2(k-1)})]$ |
| PSI = $[z_1, \ldots, z_{k-1}]$ | | PSI = $[z_k, \ldots, z_{2(k-1)}]$ |

In the next key agreement algorithm, the new set of shares will be used and old share will no longer be valid. As a result of the key agreement each party will reconstruct the same old secret value.

b. In the second method, dynamic secret value mode, the share is updated in such a way that the value of the secret will also change when reconstructed from the new shares. Thus, in the next key agreement, completely new shares are used and each party will generate a new secret value.

The process of updating existing PSI stored at each party starts just after the key agreement process done. So, the old shares would not be valid for the next key exchange process. The steps involved in this process are,
   a) Each party will choose a truly random number.
   b) Each party will create shares for the random number and destroy the random number. Let's call them "delta shares"
   c) Shares are exchanged to other party as given in the table.
   d) Then each party updates the shares by adding the delta shares.

TABLE 6

| Pi-Control Platform | Public Channel | Entity |
|---|---|---|
| Existing Pre-shared Information | | Existing Pre-shared Information |
| PSI = $[s_1, \ldots, s_{k-1}]$ | | PSI = $[s_k, \ldots, s_n]$ |
| Reconstruct Crypto-ID | | Reconstruct Crypto-ID |
| K = $f(I_A) + f(I_B)$ | | K = $f(I_A) + f(I_B)$ |
| | Encrypted Channel: Now onwards all messages | |
| $r_1$ ← Random( ) | $[w_k, \ldots, w_n]$ → | $r_2$ ← Random( ) |
| $[w_1, \ldots, w_n]$ ← | ← $[q_1, \ldots, q_{k-1}]$ | $[q_1, \ldots, q_n]$ ← |
| Split($r_1$, k, n) | | Split($r_2$, k, n) |
| Update Shares: | | Update Shares: |
| PSI = | | PSI = |
| $[(s_1 + w_1 + q_1), \ldots,$ | | $[(s_k + w_k + q_k), \ldots,$ |
| $(s_{k-1} + w_{k-1} + q_{k-1})]$ | | $(s_n + w_n + q_n)]$ |
| PSI = $[z_1, \ldots, z_{k-1}]$ | | PSI = $[z_k, \ldots, z_n]$ |

In the next key agreement process the new shares will be used and old share will no longer be valid. As a result of the key agreement each party will reconstruct a completely new secret value.

Here, the setup process is needed to be done only once. For consequent communications there is only key agreement and update process are needed.

Thus, the identity-based authenticated key agreement uses the identity of the user for authentication. Here, the system employs (k, n) threshold secret sharing scheme that provides information theoretic secrecy such that, it cannot be broken by unlimited computing power.

According to one of the embodiments of the present invention a system for secure communication between two or more parties over a communication network comprises a first party/device capable of communicating over a network, the first party/device comprises at least one processor, the first processor, at least one memory communicatively coupled to the first processor and at least one communication management module capable of managing transceiver activity and communicatively coupled to the first processor, at least one other party/device capable of communicating over a network, the other party/device comprises at least one processor, the other processor, at least one memory communicatively coupled to the other processor and at least one communication management module capable of managing transceiver activity and communicatively coupled to the other processor, and a network for facilitating a communication channel between the first party/device and the at least one other party/device.

The first party/device for example a Pi-Control Platform is a first communication device that includes desktop computer, laptop computers, mobile devices, handheld electronic devices, Internet of Things (IoT) devices, electronic embedded system capable of electronic communication and the like.

The other party/device for example a second party/device an Entity is a other communication party/device that includes desktop computer, laptop computers, mobile devices, handheld electronic devices, Internet of Things (IoT) devices, electronic embedded system capable of electronic communication and the like.

In an implementation according to one of the embodiments of the system of present invention, the first processor of the first party/device is configured to communicate over the communication channel, a threshold number of shares 'k' required to reconstruct the secret information, communicate over the communication channel, the total number of shares 'n' in which the identity of first party/device shall be divided such that n=2(k−1), establish an encryption/decryption key, establish, in broadcast mode or communication mode, a pre-shared information (PSI) at first party/device, obtain, shared key, by receiving exchange key by first party/device from other party/device and reconstructing the secret from the shares and exchange key received, verify shared key, by generating the hash values by applying hash function to the set of shared key and the random value at first party/device, communicate the generated hash value and the random value from first party/device in communication to other party/device, generate the hash values by applying hash function to the set of shared key and the received random value from other party/device and compare the resultant hash value with that of the received hash value from other party/device, and update pre-shared information at first party/device in static secret value mode or dynamic secret value mode after each key agreement.

In an implementation according to one of the embodiments of the system of present invention, the other processor of the other party/device is configured to communicate over the communication channel, a threshold number of shares 'k' required to reconstruct the secret information, communicate over the communication channel, the total number of shares 'n' in which the identity of other party/device shall be divided such that n=2(k−1), establish an encryption/decryption key, establish, in broadcast mode or communication mode, a pre-shared information (PSI) at other party/device, obtain, shared key, by receiving exchange key by other party/device from first party/device and reconstructing the secret from the shares and exchange key received, verify shared key, by generating the hash values by applying hash function to the set of shared key and the random value at other party/device, communicate the generated hash value and the random value from other party/device to first party/device, generate the hash values by applying hash function to the set of shared key and the received random value from first party/device and compare the resultant hash value with that of the received hash value from first party/device, and update pre-shared information at other party/device in static secret value mode or dynamic secret value mode after each key agreement.

In an implementation according to one of the embodiments of the system of present invention, for establishing, in broadcast mode a pre-shared information (PSI) at the first party/device, the first processor is configured to divide, a secret 's' (s←f($I_A$)) into 'n' number of shares such that n=2(k−1) where 'k' is the threshold number of shares required to reconstruct the secret information, encrypt, the shares from $s_k$ to $s_{2(k-1)}$ by using the encryption key $K_F$ to form an encrypted dataset/data packet $E_1$, $E_1$←Encrypt([$s_k$, . . . , $s_{2(k-1)}$], $K_F$) and communicate, the dataset/data packet $E_1$ from the first party/device to other party/devices in the communication. Further, the first processor is configured to establish, the Pre-Shared Information for the first party/device by updating the PSI as set of $s_i$ where i takes the values from 1 to (k−1) such that PSI=[$s_1$, . . . , $s_{(k-1)}$].

In an implementation according to one of the embodiments of the system of present invention, for establishing, in broadcast mode a pre-shared information (PSI) at the other party/device, the other processor is configured to decrypt, the dataset/data packet $E_1$ received from the first party/device and establish, the Pre-Shared Information for the other party/device in communication by updating the PSI as set of si where i takes the values from k to 2(k−1) such that PSI=[$s_k$, . . . , $s_{2(k-1)}$].

In an implementation according to one of the embodiments of the system of present invention, for establishing, in communication mode a pre-shared information (PSI) at the first party/device, the first processor is configured to divide, a secret 's' (s←f($I_A$)) into 'n' number of shares such that n=2(k−1) where 'k' is the threshold number of shares required to reconstruct the secret information, encrypt, the shares from $s_k$ to $s_{2(k-1)}$ by using the encryption key $K_F$ to form an encrypted dataset/data packet $E_1$, $E_1$←Encrypt[$s_k$, . . . , $s_{2(k-1)}$], $K_F$), communicate, the dataset/data packet $E_1$ from the first party/device to other party/devices in the communication, and decrypt, the dataset/data packet $E_2$ received from the other party/device in communication by the first party/device in communication. Further, the first processor, is configured to establish, the Pre-Shared Information for the first party/device by updating the $s_i$ by generating ($s_i$+$p_i$) where i takes the values from 1 to (k−1) such that PSI=[$s_1$, . . . , $s_{(k-1)}$].

In an implementation according to one of the embodiments of the system of present invention, for establishing, in communication mode a pre-shared information (PSI) at the other party/device, the other processor is configured to divide, a secret 'p' (p←f($I_B$)) into 'n' number of shares such that n=2(k−1) where 'k' is the threshold number of shares required to reconstruct the secret information, encrypt, the shares from $p_i$ to $p_{(k-1)}$ by using the encryption key $K_F$ to form an encrypted dataset/data packet $E_2$, $E_2$←Encrypt([$p_1$, . . . , $p_{(k-1)}$], $K_F$), communicate, the dataset/data packet $E_2$ from the other party/devices in the communication to the first party/device in communication. Further, the other processor is configured to decrypt, the dataset/data packet $E_1$ received from the first party/device by the other devices in the communication and establish, the Pre-Shared Information for the other party/device in communication by updating the $s_i$ by generating ($s_i$+$p_i$) where i takes the values from k to 2(k−1) such that PSI=[$s_k$, . . . , $s_{2(k-1)}$].

In an implementation according to one of the embodiments of the system of present invention, for obtaining shared key at the first party/device, the first processor is configured to collect, all the shares from the established PSI for the first party/device, select randomly one of the share value of $s_i$ as an exchange key 'X' from the resultant $s_i$ values where i=1, . . . , k−1 and X←$s_i$, and communicate the same to the other party/device in communication and determine, a shared key $K_1$ by reconstructing the set of values of $s_i$ where i=1, . . . (k−1) and Y such that $K_1$←Reconstruct[$s_1$, . . . , $s_{k-1}$, Y] where $K_1$=f($I_A$)+f($I_B$).

In an implementation according to one of the embodiments of the system of present invention, for obtaining shared key at the other party/device, the other processor is configured to collect, all the shares from the established PSI for the other party/device in communication select, randomly one of the share value of $s_j$ as an exchange key 'Y' from the resultant $s_j$ values where j=k, . . . , 2(k−1) and Y←$s_j$ and communicate the same to the first party/device in communication and determine, a shared key $K_2$ by reconstructing the set of values of $s_j$ where j=k, . . . 2(k−1) and X such that $K_2$←Reconstruct [$s_k$, . . . , $s_{2(k-1)}$, X] where $K_2$=f($I_A$)+f($I_B$).

In an implementation according to one of the embodiments of the system of present invention, for verifying shared key at the first party/device, the first processor is configured to select, a random value $R_1$ such that $R_1$←Random( ), generate, hash value 'U' by applying hash function to the set of it's shared key $K_1$ and the selected random value $R_1$ such that $U \leftarrow H(K_1, R_1)$, communicate, the generated hash value 'U' and the random value $R_1$ [U, $R_1$] to the other party/device in the communication. Further, the first processor is configured to generate, hash value by applying hash function to the set of it's shared key $K_1$ and the random value $R_2$ received from the other party/device in the communication, compare for equality the resultant hash value with the hash value 'V' received from the other party/device in the communication, confirm, upon finding the equality, the verification that the shared key at the first party/device in communication is same as that of the shared key at the other party/device in the communication and authenticate the other party/device in the communication.

In an implementation according to one of the embodiments of the system of present invention, for verifying shared key at the other party/device, the other processor is configured to select, a random value $R_2$ such that $R_2 \leftarrow \text{Random}()$, generate, hash value 'V' by applying hash function to the set of it's shared key $K_2$ and the selected random value $R_2$ such that $V \leftarrow H(K_2, R_2)$, communicate, the generated hash value 'V' and the random value $R_2$ [V, $R_2$] to the first party/device in communication. Further, the other processor is configured to generate, hash value by applying hash function to the set of it's shared key $K_2$ and the random value $R_1$ received from the first party/device in communication, compare for equality the resultant hash value with the hash value 'U' received from the first party/device in communication, confirm, upon finding the equality, the verification that the shared key at the other party/device in the communication is same as that of the shared key at the first party/device in communication and authenticate the first party/device in communication.

In an implementation according to one of the embodiments of the system of present invention, for updating pre-shared information in static secret value mode at the first party/device, the first processor is configured to extract, respective PSI information and reconstruct the respective secret i.e. shared key K such that K=s, divide, a secret value zero into 'n' number of shares [$w_1, \ldots, w_n$] such that $w_i \neq$ '0' and n=2(k−1) where 'k' is the threshold number of shares required to reconstruct the secret information, and encrypt, by using the respective shared key K, the set of shares $w_k$ to $w_{2(k-1)}$ i.e. [$w_k, \ldots, w_{2(k-1)}$] and communicate the same over encrypted channel to the other party/devices in communication. Further, the first processor is configured to update, the Pre-Shared Information for the first party/device, by obtaining new set of shares [$z_1, \ldots, z_{k-1}$] by decrypting the received encrypted set of shares [$q_1, \ldots, q_{(k-1)}$] to get the set of shares [$q_1, \ldots, q_{(k-1)}$] and adding the shares $s_i$, $w_i$, and $q_i$ index-wise where i takes the value from 1 to (k−1) such that [$z_1, \ldots, z_{k-1}$] $\leftarrow$ [$(s_1+w_1+q_1), \ldots, (s_{k-1}+w_{k-1}+q_{k-1})$], i=1, \ldots, k−1 and PSI=[$z_1, \ldots, z_{k-1}$].

In an implementation according to one of the embodiments of the system of present invention for updating pre-shared information in static secret value mode at the other party/device, the other processor is configured to extract, respective PSI information and reconstruct the respective secret i.e. shared key K such that K=s, divide, a secret value zero into 'n' number of shares [$q_1, \ldots, q_n$] such that $q_i \neq$ '0' and n=2(k−1) where 'k' is the threshold number of shares required to reconstruct the secret information and encrypt, by using the respective shared key K, the set of shares $q_1$ to $q_{k-1}$ i.e. [$q_1, \ldots, q_{k-1}$] and communicate the same over encrypted channel to the first party/device. Further, the other processor is configured to update, the Pre-Shared Information for the other devices in communication, by obtaining new set of shares [$z_k, \ldots, z_{2(k-1)}$] by decrypting the received encrypted set of shares [$w_k, \ldots, w_{2(k-1)}$] to get the set of shares [$w_k, \ldots, w_{2(k-1)}$] and adding the shares $s_i$, $w_i$, and $q_i$ index-wise where i takes the value from k to 2(k−1) such that [$z_k, \ldots, z_{2(k-1)}$] $\leftarrow$ [$(s_k+w_k+q_k), \ldots, (s_{2(k-1)}+w_{2(k-1)}+q_{2(k-1)})$], i=k, \ldots, 2(k−1) and PSI=[$z_k, \ldots, z_{2(k-1)}$].

In an implementation according to one of the embodiments of the system of present invention for updating pre-shared information in dynamic secret value mode at the first party/device, the first processor is configured to extract, respective PSI information and reconstruct the respective secret i.e. shared key K such that K=s, divide, a secret random value 'r1' selected by the first party/device into 'n' number of shares [$w_1, \ldots, w_n$] such that $w_i \neq$ '0' and n=2(k−1) where 'k' is the threshold number of shares required to reconstruct the secret information, and encrypt, by using the respective shared key K, the set of shares $w_k$ to $w_n$ i.e. [$w_k, \ldots, w_n$] and communicate the same over encrypted channel to the other party/devices in communication. Further, the first processor is configured to update, the Pre-Shared Information for the first party/device, by obtaining new set of shares [$z_1, \ldots, z_{k-1}$] by decrypting the received encrypted set of shares [$q_1, \ldots, q_{(k-1)}$] to get the set of shares [$q_1, \ldots, q_{(k-1)}$] and adding the shares $s_i$, $w_i$, and $q_i$ index-wise where i takes the value from 1 to (k−1) such that [$z_1, \ldots, z_{k-1}$] $\leftarrow$ [$(s_1+w_1+q_1), \ldots, (s_{k-1}+w_{k-1}+q_{k-1})$], i=1, \ldots, k−1 and PSI=[$z_1, \ldots, z_{k-1}$] and reconstruct, the newly obtained set of shares to get completely new secret value.

In an implementation according to one of the embodiments of the system of present invention for updating pre-shared information in dynamic secret value mode at the other party/device, the other processor is configured to extract, respective PSI information and reconstructing the respective secret i.e. shared key K such that K=s, divide, a secret random value '$r_2$' selected by the other party/device in communication into 'n' number of shares [$q_1, \ldots, q_1$] such that $q_i \neq$ '0' and n=2(k−1) where 'k' is the threshold number of shares required to reconstruct the secret information and encrypt, by using the respective shared key K, the set of shares $q_1$ to $q_{k-1}$ i.e. [$q_1, \ldots, q_{k-1}$] and communicate the same over encrypted channel to the first party/device. Further, the other processor is configured to update, the Pre-Shared Information for the other party/devices in communication, by obtaining new set of shares [$z_k, \ldots, z_n$] by decrypting the received encrypted set of shares [$w_k, \ldots, w_n$] to get the set of shares [$w_k, \ldots, w_n$] and adding the shares $s_i$, $w_i$, and $q_i$ index-wise where i takes the value from k to n such that [$z_k, \ldots, z_n$] $\leftarrow$ [$(s_k+w_k+q_k), \ldots, (s_n+w_n+q_n)$], i=k, \ldots, n and PSI=[$z_k, \ldots, z_n$], and reconstruct, the newly obtained set of shares to get completely new secret value.

For updating pre-shared information in dynamic secret value mode, if the secret random value selected by each party/device in communication is zero value then only the shares will get updated however, the secret remain unaltered/unchanged.

The FIG. 2 illustrates a flow diagram of the method for secure communication between two or more parties over a communication network according to one of the embodiment of the present invention.

In an implementation according to one of the embodiment of the present invention, the method for secure communication between two or more parties over a communication network comprises a setup step, the setup step wherein the at least two parties involved in the communication process establishes a pre-shared information with each other based on their identity. Considering that two parties are involved in communication, a first party/device a Pi-Control Platform having identity $I_A$ and a second party/device an Entity having identity $I_B$, the steps of setup step are explained herewith.

The step of setup includes the step of communicating in agreement over a communication channel that may be a secured or unsecured channel a threshold number of shares 'k' required to reconstruct the secret information such that any set of less than 'k' number of shares will not give any clue about the secret information.

The step of setup includes the step of communicating in agreement over a communication channel that may be a secured or unsecured channel, the total number of shares 'n' in which the identity of each party/device shall be divided by respective parties such that n=2(k−1).

The step of setup includes the step of establishing an initial encryption/decryption key (herein after referred as key) $K_F$ in agreement with all the parties/devices, at all the parties/devices involved in communication by communicating the key $K_F$ over a communication channel that may be a secured or unsecured, or over an out of band communication channel or by offline means to all the parties/devices involved in communication.

In an implementation according to one of the embodiment of the present invention, the step of setup includes a step of establishing a pre-shared information (PSI) at each of the party/device in the communication wherein the step of establishing a pre-shared information (PSI) at each of the party/device in the communication is performed in broadcast mode or communication mode.

FIG. 3 illustrates a flow diagram of the method step of establishing, in broadcast mode a pre-shared information (PSI) at each of the party/device in the communication according to one of the embodiment of the present invention. The step of establishing a pre-shared information (PSI) at each of the party/device in the communication in broadcast mode includes the step (301) of dividing a secret 's', the secret 's' i.e. function of $I_A$ (s←f($I_A$)) where $I_A$ is the identity of the first party/device i.e. the Pi-Control Platform, is divided into 'n' number of shares such that n=2(k−1) where 'k' is the threshold number of shares required to reconstruct the secret information such that any set of less than 'k' number of shares will not give any clue about the secret information.

The step of establishing a pre-shared information (PSI) at each of the party/device in the communication in broadcast mode includes the step (302) of encrypting by the first party/device i.e. the Pi-Control Platform, the shares from $s_k$ to $s_{2(k-1)}$ by using the encryption key $K_F$ to form an encrypted dataset/data packet $E_1$.

$E_1$←Encrypt([$s_k$, . . . ,$s_{2(k-1)}$],$K_F$)

The step of establishing a pre-shared information (PSI) at each of the party/device in the communication in broadcast mode includes the step (303) of communicating the dataset/data packet $E_1$ from the first party/device, in the present example case the Pi-Control Platform to other devices in the communication, in the present example case the second party/device i.e. the Entity.

The step of establishing a pre-shared information (PSI) at each of the party/device in the communication in broadcast mode includes the step (304) of decrypting the dataset/data packet $E_1$ received from the first party/device, in the present example case the Pi-Control Platform by the other devices in the communication, in the present example case the second party/device i.e. the Entity by using the key $K_F$.

The step of establishing a pre-shared information (PSI) at each of the party/device in the communication in broadcast mode includes the step (305) of establishing the Pre-Shared Information (herein after referred as PSI) for the first party/device, in the present example case the Pi-Control Platform by updating the PSI as set of $s_i$ where i takes the values from 1 to (k−1) such that PSI=[$s_1$, . . . , $s_{(k-1)}$].

The step of establishing a pre-shared information (PSI) at each of the party/device in the communication in broadcast mode includes the step (306) of establishing the Pre-Shared Information (herein after referred as PSI) for the other party/device in communication, the second party/device, in the present example case the Entity by updating the PSI as set of $s_i$ where i takes the values from k to 2(k−1) such that PSI=[$s_k$, . . . , $s_{2(k-1)}$].

FIG. 4 illustrates a flow diagram of the method step of establishing, in communication mode a pre-shared information (PSI) at each of the party/device in the communication according to one of the embodiment of the present invention. The step of establishing a pre-shared information (PSI) at each of the party/device in the communication in communication mode includes the step (401) of dividing a secret 's', the secret 's' i.e. function of $I_A$ (s←f($I_A$)) where $I_A$ is the identity of the first party/device i.e. the Pi-Control Platform, is divided into 'n' number of shares such that n=2(k−1) where 'k' is the threshold number of shares required to reconstruct the secret information such that any set of less than 'k' number of shares will not give any clue about the secret information.

The step of establishing a pre-shared information (PSI) at each of the party/device in the communication in communication mode includes the step (402) of dividing a secret 'p', the secret 'p' i.e. function of $I_B$ (p←f($I_B$)) where $I_B$ is the identity of the second party/device i.e. the Entity, is divided into 'n' number of shares such that n=2(k−1) where 'k' is the threshold number of shares required to reconstruct the secret information such that any set of less than 'k' number of shares will not give any clue about the secret information.

The step of establishing a pre-shared information (PSI) at each of the party/device in the communication in communication mode includes the step (403) of encrypting by the first party/device i.e. the Pi-Control Platform, the shares from $s_k$ to $s_{2(k-1)}$ by using the encryption key $K_F$ to form an encrypted dataset/data packet $E_1$. $E_1$←Encrypt([$s_k$, . . . , $s_{2(k-1)}$], $K_F$)

The step of establishing a pre-shared information (PSI) at each of the party/device in the communication in communication mode includes the step (404) of encrypting by the other party/device in communication i.e. the second party/device i.e. the Entity, the shares from $p_i$ to $p_{(k-1)}$ by using the encryption key $K_F$ to form an encrypted dataset/data packet $E_2$. $E_2$←Encrypt([$p_1$, . . . , $p_{(k-1)}$], $K_F$)

The step of establishing a pre-shared information (PSI) at each of the party/device in the communication in communication mode includes the step (405) of communicating the dataset/data packet $E_1$ from the first party/device, in the present example case the Pi-Control Platform to other party/devices in the communication, in the present example case the second party/device i.e. the Entity.

The step of establishing a pre-shared information (PSI) at each of the party/device in the communication in communication mode includes the step (406) of communicating the dataset/data packet $E_2$ from the other party/devices in the communication in the present example case the second party/device, i.e. the Entity to other devices in the communication, in the present example case the first party/device i.e. the Pi-Control Platform.

The step of establishing a pre-shared information (PSI) at each of the party/device in the communication in communication mode includes the step (407) of decrypting the dataset/data packet $E_2$ received from the other party/device in communication, in the present example case the second party/device, i.e. the Entity by the other devices in the communication, in the present example case the first party/device i.e. the Pi-Control Platform by using the key $K_F$.

The step of establishing a pre-shared information (PSI) at each of the party/device in the communication in communication mode includes the step (408) of decrypting the dataset/data packet $E_1$ received from the first party/device, in the present example case the Pi-Control Platform to by the other devices in the communication, in the present example case the second party/device i.e. the Entity by using the key $K_F$.

The step of establishing a pre-shared information (PSI) at each of the party/device in the communication in communication mode includes the step (409) of establishing the Pre-Shared Information (herein after referred as PSI) for the first party/device, in the present example case the Pi-Control Platform by updating the $s_i$ by generating $(s_i+p_i)$ where i takes the values from 1 to (k−1) such that $s_i \leftarrow (s_i+p_i), i=1, \ldots, k-1$ and PSI=$[s_1, \ldots, s_{(k-1)}]$ The step of establishing a pre-shared information (PSI) at each of the party/device in the communication in communication mode includes the step (410) of establishing the Pre-Shared Information (herein after referred as PSI) for the other party/device in communication, in the present example case the second party/device i.e. the Entity by updating the $s_i$ by generating $(s_i+p_i)$ where i takes the values from k to 2(k−1) such that $s_i \leftarrow (s_i+p_i)$, i=k, . . . , 2(k−1) and PSI=$[s_k, \ldots, s_{2(k-1)}]$ In an implementation according to one of the embodiment of the present invention, the method for secure communication between two or more parties over a communication network comprises a step of obtaining shared key, the step of obtaining shared key wherein shared Key K is determined by each party in communication, in the present example the Pi-Control Platform and the Entity, by receiving exchange key from other party. The steps of shared key obtaining step are explained herewith.

FIG. 5 illustrates a flow diagram of the method step of obtaining shared key at each of the party/device in the communication according to one of the embodiment of the present invention.

The step of obtaining shared key includes a step (501) of collecting, by the first party/device all the shares from the established PSI for the first party/device, in the present example case the Pi-Control Platform.

The step of obtaining shared key includes a step (502) of collecting, by the second party/device all the shares from the established PSI for the other party/device in communication, in the present example case the second party/device i.e. the Entity.

The step of obtaining shared key includes a step (503) of selecting randomly one of the resultant value of $s_i$ as an exchange key 'X' from the resultant $t_i$ values where i=1, . . . , k−1 and $X \leftarrow s_i$, by the first party/device, in the present example case the Pi-Control Platform and communicating the same to the other party/device in communication, in the present example case the second party/device in communication i.e. the Entity. For e.g. $X \leftarrow s_1$ The step of obtaining shared key includes a step (504) of selecting randomly one of the resultant value of $s_j$ as an exchange key 'Y' from the resultant $s_j$ values where j=k, . . . , 2(k−1) and $Y \leftarrow s_j$ by the other party/device in communication, in the present example case the second party/device i.e. the Entity and communicating the same to the first party/device in communication in the present example case the Pi-Control Platform. For e.g. $Y \leftarrow s_k$ The step of obtaining shared key includes a step (505) of determining shared key $K_1$ by the first party/device, in the present example case the Pi-Control Platform by reconstructing the set of values of $s_i$ where i=1, . . . (k−1) and Y such that $K_1 \leftarrow$Reconstruct$[s_1, \ldots, s_{k-1}, Y]$ where $K_1$=s+p.

The step of obtaining shared key includes a step (506) of determining shared key K2 by the other party/device in communication, in the present example case the second party/device i.e. the Entity by reconstructing the set of values of sj where j=k, . . . 2(k−1) and X such that $K_2 \leftarrow$Reconstruct $[s_k, \ldots, s_{2(k-1)}, X]$ where $K_2$=s+p.

Thus, the shared key obtained in the step of obtaining shared key by both the parties/devices is same i.e. $K=K_1=K_2$. This key is used for encrypting the channel i.e. all the communicated messages.

In an implementation according to one of the embodiment of the present invention, the method for secure communication between two or more parties over a communication network comprises a shared key verification step, the shared key verification step wherein the verification is performed by taking a random value and generating the hash values by applying hash function to the set of shared key and the random value at each party/device in the communication, communicating the generated hash value and the random value from each party/device in communication to other device in communication, generating the hash values by applying hash function to the set of shared key and the received random value from other communicating device and comparing the resultant hash value with that of the received hash value from other communication device and upon matching both the values confirming the verification that the shared key at each party/device in communication is same. The steps of shared key verification step in the present example case where the first party/device, the Pi-Control Platform is in communication with the second party/device, the Entity are explained herewith.

FIG. 6 illustrates a flow diagram of the method step of verifying shared key at each of the party/device in the communication according to one of the embodiment of the present invention.

The step of verifying shared key includes step (601) of selecting by the first party/device, the Pi-Control Platform, a random value $R_1$ such that $R_1 \leftarrow$Random( )

The step of verifying shared key includes step of (602) selecting by the other party/device in the communication, in the present example case the second party/device, the Entity, a random value $R_2$ such that $R_2 \leftarrow$Random( ).

The step of verifying shared key includes step (603) of generating hash value 'U' by the first party/device, the Pi-Control Platform by applying hash function to the set of it's shared key $K_1$ and the selected random value $R_1$ such that $U \leftarrow H(K_1, R_1)$.

The step of verifying shared key includes step (604) of generating hash value 'V' by the other party/device in the communication, in the present example case the second party/device, the Entity by applying hash function to the set of it's shared key $K_2$ and the selected random value $R_2$ such that $V \leftarrow H(K_2, R_2)$.

The step of verifying shared key includes step (605) of communicating by the first party/device in communication, the Pi-Control Platform, the generated hash value 'U' and the random value $R_1$ [U, $R_1$] to the other party/device in the communication, in the present example case the second party/device, the Entity.

The step of verifying shared key includes step (606) of communicating by the other party/device in the communication, in the present example case the second party/device, the Entity, the generated hash value 'V' and the random value $R_2$ [V, $R_2$] to the first party/device in communication, the Pi-Control Platform.

The step of verifying shared key includes step (607) of generating hash value by the first party/device, the Pi-Control Platform by applying hash function to the set of it's shared key $K_1$ and the random value $R_2$ received from the other party/device in the communication, in the present example case the second party/device, the Entity, and comparing (608) for equality the resultant hash value with the hash value 'V' received from the other party/device in the communication, in the present example case the second party/device, the Entity, and upon finding the equality confirming (609) the verification that the shared key at the first party/device in communication, the Pi-Control Platform is same as that of the shared key at the other party/device in the communication, in the present example case the second party/device, the Entity thus authenticating the other party/device in the communication, in the present example case the second party/device, the Entity.

The step of verifying shared key includes step (610) of generating hash value by the other party/device in the communication, in the present example case the second party/device, the Entity by applying hash function to the set of it's shared key $K_2$ and the random value $R_1$ received from the first party/device in communication, the Pi-Control Platform, and comparing (611) for equality the resultant hash value with the hash value 'U' received from the first party/device in communication, the Pi-Control Platform, and upon finding the equality confirming (612) the verification that the shared key at the other party/device in the communication, in the present example case the second party/device, the Entity is same as that of the shared key at the first party/device in communication, the Pi-Control Platform thus authenticating the first party/device in communication, the Pi-Control Platform.

The step of verifying shared key includes step of concluding that both the parties have obtained the same secret upon successful verification from both the parties in communication.

In an implementation according to one of the embodiment of the present invention, the method for secure communication between two or more parties over a communication network comprises an updating pre-shared information step, the updating pre-shared information step wherein pre-shared information is updated after each key agreement in static secret value mode or dynamic secret value mode.

FIG. 7 illustrates a flow diagram of the method step of updating pre-shared information in static secret value mode at each of the party/device in the communication according to one of the embodiment of the present invention.

The step of updating pre-shared information in static secret value mode includes step (701 & 702) of extracting respective PSI information by each of all the devices in communication, in the present example case by the first party/device in the communication, the Pi-Control Platform and the other party/device in the communication, in the present example case the second party/device, the Entity and reconstruct the secret i.e. shared key K such that K=s+p, respectively.

The step of updating pre-shared information in static secret value mode includes the step (703) of dividing by the first party/device, the Pi-Control Platform a secret value zero called "zero shares" into 'n' number of shares $[w_1, \ldots, w_n]$ such that $w_i \neq$ '0' and n=2(k-1) where 'k' is the threshold number of shares required to reconstruct the secret information such that any set of less than 'k' number of shares will not give any clue about the secret information.

The step of updating pre-shared information in static secret value mode includes the step (704) of dividing by the other party/device in the communication, in the present example case the second party/device, the Entity, a secret value zero called "zero shares" into 'n' number of shares $[q_1, \ldots, q_n]$ such that $q_i \neq$ '0' and n=2(k-1) where 'k' is the threshold number of shares required to reconstruct the secret information such that any set of less than 'k' number of shares will not give any clue about the secret information.

The step of updating pre-shared information in static secret value mode includes the step (705) of encrypting by using the respective shared key K by the first party/device, the Pi-Control Platform the set of shares $w_k$ to $w_{2(k-1)}$ i.e. $[w_k, \ldots, w_{2(k-1)}]$ and communicate the same over encrypted channel to the other party/devices in communication, in present example case to the second party/device, the Entity.

The step of updating pre-shared information in static secret value mode includes the step (706) of encrypting by using the respective shared key K by the other party/device in the communication, in the present example case the second party/device, the Entity the set of shares $q_1$ to $q_{k-1}$ i.e. $[q_1, \ldots, q_{k-1}]$ and communicate the same over encrypted channel to the first party/device, in present example case to the Pi-Control Platform.

The step of updating pre-shared information in static secret value mode includes the step (707) of updating the Pre-Shared Information for the first party/device, the Pi-Control Platform by obtaining new set of shares $[z_1, \ldots, z_{k-1}]$ by decrypting the received encrypted set of shares $[q_1, \ldots, q_{k-1}]$ to get the set of shares $[q_1, \ldots, q_{k-1}]$ and adding the shares $s_i$, $w_i$, and $q_i$ index-wise where i takes the value from 1 to (k-1) such that $[z_1, \ldots, z_{k-1}] \leftarrow [(s_i+w_i+q_i), \ldots, (s_{k-1}+w_{k-1}+q_{k-1})]$, i=1, \ldots, k-1 and $PSI=[z_1, \ldots, z_{k-1}]$ The step of updating pre-shared information in static secret value mode includes the step (708) of updating the Pre-Shared Information for the other devices in communication, in present example case to the second party/device, the Entity by obtaining new set of shares $[z_k, \ldots, z_{2(k-1)}]$ by decrypting the received encrypted set of shares $[w_k, \ldots, w_{2(k-1)}]$ to get the set of shares $[w_k, \ldots, w_{2(k-1)}]$ and adding the shares $s_i$, $w_i$, and $q_i$ index-wise where i takes the value from k to 2(k-1) such that $[z_k, \ldots, z_{2(k-1)}] \leftarrow [(s_k+w_k+q_k), \ldots, (s_{2(k-1)}+w_{2(k-1)}+q_{2(k-1)})]$, i=k, \ldots, 2(k-1) and $PSI=[z_k, \ldots, z_{2(k-1)}]$ The step of updating pre-shared information in static secret value mode updates the shares in the PSI without affecting the value of the secret such that upon reconstructing the shares the reconstruction results in the same old secret as explained below:

$$\text{Reconstruct}[z_1, \ldots, z_n] \leftarrow r = (s+w+q) = (s+0+0) = s$$

FIG. 8 illustrates a flow diagram of the method step of updating pre-shared information in dynamic secret value mode at each of the party/device in the communication according to one of the embodiment of the present invention.

The step of updating pre-shared information in dynamic secret value mode includes step (801 & 802) of extracting respective PSI information by each of all the devices in communication, in the present example case by the first party/device, the Pi-Control Platform and the other devices in communication, in present example case to the second party/device, the Entity and reconstruct the secret i.e. shared key K such that K=s, respectively.

The step of updating pre-shared information in dynamic secret value mode includes the step (803) of dividing by the first party/device, the Pi-Control Platform a secret random value '$r_1$' selected by the first party/device, the Pi-Control Platform into 'n' number of shares [$w_1, \ldots, w_n$] such that $w_i \neq$ '0' and n=2(k−1) where 'k' is the threshold number of shares required to reconstruct the secret information such that any set of less than 'k' number of shares will not give any clue about the secret information.

The step of updating pre-shared information in dynamic secret value mode includes the step (804) of dividing by the other devices in communication, in present example case to the second party/device, the Entity, a secret random value '$r_2$' selected by the second party/device, the Entity, into 'n' number of shares [$q_1, \ldots, q_n$] such that $q_i \neq$ '0' and n=2(k−1) where 'k' is the threshold number of shares required to reconstruct the secret information such that any set of less than 'k' number of shares will not give any clue about the secret information.

The step of updating pre-shared information in dynamic secret value mode includes the step (805) of encrypting by using the respective shared key K by the first party/device, the Pi-Control Platform the set of shares $w_k$ to $w_n$ i.e. [$w_k, \ldots, w_n$] and communicate the same over encrypted channel to other party/devices in communication, in present example case to the second party/device, the Entity.

The step of updating pre-shared information in dynamic secret value mode includes the step (806) of encrypting by using the respective shared key K by the other party/devices in communication, in present example case to the second party/device, the Entity the set of shares $q_i$ to $q_{k-1}$ i.e. [$q_1, \ldots, q_{k-1}$] and communicating the same over encrypted channel to other devices in communication, in present example case to the first party/device, the Pi-Control Platform.

The step of updating pre-shared information in dynamic secret value mode includes the step (807) of updating the Pre-Shared Information for the first party/device, the Pi-Control Platform by obtaining new set of shares [$z_1, \ldots, z_{k-1}$] by decrypting the received encrypted set of shares [$q_1, \ldots, q_{(k-1)}$] to get the set of shares [$q_1, \ldots, q_{(k-1)}$] and adding the shares $s_i$, $w_i$, and $q_i$ index-wise where i takes the value from 1 to (k−1) such that [$z_1, \ldots, z_{k-1}$]←[($s_i$+$w_i$+$q_i$), $\ldots$, ($s_{k-1}$+$w_{k-1}$+$q_{k-1}$)], i=1, $\ldots$, k−1 and PSI=[$z_1, \ldots, z_{k-1}$]

The step of updating pre-shared information in dynamic secret value mode includes the step (808) of updating the Pre-Shared Information for the other devices in communication, in present example case to the second party/device, the Entity by obtaining new set of shares [$z_k, \ldots, z_n$] by decrypting the received encrypted set of shares [$w_k, \ldots, w_n$] to get the set of shares [$w_k, \ldots, w_n$] and adding the shares $s_i$, $w_i$, and $q_i$ index-wise where i takes the value from k to n such that [$z_k, \ldots, z_n$]←[($s_k$+$w_k$+$q_k$), $\ldots$, ($s_n$+$w_n$+$q_n$)], i=k, $\ldots$, n and PSI=[$z_k, \ldots, z_n$]

The step of updating pre-shared information in dynamic secret value mode includes the step (809) of updating the shares in the PSI without affecting the value of the secret such that upon reconstructing the shares the reconstruction results into completely new secret value as explained below:

$$\text{Reconstruct}[z_1, \ldots, z_n] \rightarrow r = (s + w + q)$$

Thus, the step of updating pre-shared information in dynamic secret value mode updates and results into new secrets as well as new shares to be used in the next key agreement.

Here, the setup process is needed to be done only once. For consequent communications there is only key agreement and update process are needed.

Thus, the identity-based authenticated key agreement uses the identity of the user for authentication. Here, the system employs (k, n) threshold secret sharing scheme that provides information theoretic secrecy such that, it cannot be broken by unlimited computing power.

The quantum computers can break protocols based on computational hardness as they contribute to only computing power. The described system does not depend on unproven assumptions about computational hardness, instead it uses a scheme which is built on information theory and the system cannot be broken even if the adversary has unlimited computing power, due to lack of enough information, thereby providing Quantum-Resistance.

Once the shared key is established, the shares are immediately updated to a new set of shares using a secure channel encrypted with shared key. These new shares have no relation with the old shares and these will be used next time when the protocol is executed. The old shares will be no longer valid. So, each time a completely new set of shares are used for key agreement. It has no impact on the old or future agreement. Hence the system provides forward and backward secrecy.

Since the secret splitting has threshold value 'k', in order to reconstruct the secret one need at least 'k' shares. Any lesser number of shares will not give any information about the secret in any circumstances.

The present invention as implemented through various embodiments is economically viable and can be adopted by the businesses easily as it provides the higher graded security in economical plans.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with Figures.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a micro-fabrication controller, or another computing platform. Alternatively, the computing device that executes some or all of the stored instructions could be remotely located computer system, such as a server.

Further, while one or more operations have been described as being performed by or otherwise related to certain modules, devices or entities, the operations may be performed by or otherwise related to any module, device or entity.

Further, the operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the present invention.

We claim:

1. A method for secure communication between two or more parties over a communication network, said method comprising steps of:

establishing secret information based on an identity of each of the two or more parties;

dividing the secret information into n shares;

determining a threshold number k, such that k shares are required to reconstruct the secret information, and n=2(k−1);

communicating over the communication network the threshold number of shares k;

communicating over the communication network the total number of shares n;

establishing an initial encryption/decryption key $K_F$ communicating the key $K_F$ to the two or more parties from a method selected from communicating over a communication channel, communicating over an out of band communication channel, and by offline communication;

establishing, in a broadcast mode or a communication mode, a pre-shared information (PSI) at each of the two or more parties in the communication network to obtain a shared key by receiving an exchange key by a first party in the communication network from another party in the communication network to reconstruct the secret information from the shares and exchange key received;

generating a first random value for the first party;

generating a second random value for all other parties;

verifying the shared key by generating a first hash value by applying a hash function to a first set comprising the shared key and the first random value for the first party, communicating the first generated hash value and the first random value from the first party to every other party of the two or more parties in the communication network, generating second hash values by applying one or more hash functions to a second set comprising the shared key and the second random value from the other parties and comparing the first hash value with the second hash value; and updating the pre-shared information in a static secret value mode or a dynamic secret value mode after each key agreement.

2. The method as claimed in claim 1, wherein the step of establishing, in broadcast mode a pre-shared information (PSI) at each of the parties in the communication network comprise the steps of:

dividing, by the first party, a secret 's' (s←f($I_A$)) into 'n' number of shares such that n=2(k−1) where 'k' is the threshold number of shares required to reconstruct the secret information;

encrypting by the first party, the shares from $s_k$ to $s_{2(k-1)}$ by using the encryption key $K_F$ to form an encrypted dataset/data packet $E_1$, $E_1$←Encrypt([$s_k$, . . . , $s_{2(k-1)}$], $K_F$);

communicating, by the first party, the dataset/data packet $E_1$ from the first party to other party/devices in the communication network;

decrypting, by the other party/devices in the communication network, the dataset/data packet $E_1$ received from the first party;

establishing by the first party, the Pre-Shared Information for the first party by updating the PSI as set of $s_i$ where i takes values from 1 to (k−1) such that PSI=[$s_1$, . . . , $s_{(k-1)}$]; and establishing, by the other party in the communication network, the Pre-Shared Information for the other party in communication by updating the PSI as set of $s_i$ where i takes values from k to 2(k−1) such that PSI=[$s_k$, . . . , $s_{2(k-1)}$].

3. The method as claimed in claim 1, wherein the step of establishing, in communication mode a pre-shared information (PSI) at each of the parties in the communication network comprise the steps of:

dividing, by the first party, a secret 's' (s←f($I_A$)) into 'n' number of shares such that n=2(k−1) where 'k' is the threshold number of shares required to reconstruct the secret information;

dividing, by the other party, a secret 'p' (p←f($I_B$)) into 'n' number of shares such that n=2(k−1) where 'k' is the threshold number of shares required to reconstruct the secret information;

encrypting, by the first party the shares from $s_k$ to $s_{2(k-1)}$ by using the encryption key $K_F$ to form an encrypted dataset/data packet $E_1$, $E_1$←Encrypt(|[$s_k$, . . . , $s_{2(k-1)}$], $K_F$);

encrypting, by the other party, the shares from $p_1$ to $p_{(k-1)}$ by using the encryption key $K_F$ to form an encrypted dataset/data packet $E_2$, $E_2$←Encrypt([$p_1$, . . . , $p_{(k-1)}$], $K_F$);

communicating, by the first party, the dataset/data packet $E_1$ from the first party to the other party;

communicating, by the other party, the dataset/data packet $E_2$ from the other party to the first party;

decrypting, by the first party, the dataset/data packet $E_2$ received from the other party;

decrypting, by the other party, the dataset/data packet $E_1$ received from the first;

establishing, by the first party, the Pre-Shared Information for the first party by updating an $s_i$ by generating ($s_i$+$p_i$) where i takes values from 1 to (k−1) such that PSI=[$s_1$, . . . , $s_{(k-1)}$]; and establishing, by the other party, the Pre-Shared Information for the other party by updating the $s_i$ by generating $(s_i+p_i)$ where i takes the values from k to $2(k-1)$ such that PSI=$[s_k, \ldots, s_{2(k-1)}]$.

4. The method as claimed in claim 1, wherein the step of obtaining the shared key at each of the parties in the communication network comprise the steps of:
   collecting, by the first party, all the shares from the established PSI for the first party;
   collecting, by the other party, all the shares from the established PSI for the other party;
   selecting, by the first party, randomly one of the shares of $s_i$ as an exchange key 'X' to generate $t_i$ values where i=1, ..., k−1 and X←$s_i$, and communicating the $t_i$ values to the other party;
   selecting, by the other party, randomly one of the shares of $s_j$ as an exchange key 'Y' to generate $s_j$ values where j=k, ..., 2(k−1) and Y←$s_j$ and communicating the $s_i$ values to the first party;
   determining, by the first party a shared key $K_1$ by reconstructing the set of values of $s_i$ where i=1, ... (k−1) and Y such that $K_1$←Reconstruct $[s_1, \ldots, s_{k-1}, Y]$ where $K_1$=s+p;
   determining, by the other party a shared key $K_2$ by reconstructing the set of values of $s_j$ where j=k, ... 2(k−1) and X such that $K_2$←Reconstruct $[s_k, \ldots, s_{2(k-1)}, X]$ where $K_2$=s+p.

5. The method as claimed in claim 1, wherein the step of verifying the shared key at each of the party/device in the communication comprise the steps of:
   selecting, by the first party, a random value $R_1$ such that $R_1$←Random( );
   selecting, by the other party, a random value $R_2$ such that $R_2$←Random( );
   generating a hash value 'U' by the first party, by applying a hash function to the set of the first party's shared key $K_1$ and the selected random value $R_1$ such that U←H($K_1$, $R_1$);
   generating a hash value 'V' by the other party, by applying a hash function to the set of the other party's shared key $K_2$ and the selected random value $R_2$ such that V←H($K_2$, $R_2$);
   communicating, by the first party, the generated hash value 'U' and the random value $R_1$ [U, $R_1$] to the other party;
   communicating, by the other party, the generated hash value 'V' and the random value $R_2$ [V, $R_2$] to the first party;
   generating a resultant hash value by the first party, by applying a hash function to the set of the first party's shared key $K_1$ and the random value $R_2$ received from the other party, comparing for equality the resultant hash value by the first party with the hash value 'V' received from the other party, confirming, upon finding the equality, verification that the shared key at the first party is the same as that of the shared key at the other party and authenticating the other party;
   generating a resultant hash value by the other party, by applying a hash function to the set of the other party's shared key $K_2$ and the random value $R_1$ received from the first party, comparing for equality the resultant hash value by the other party with the hash value 'U' received from the first party, confirming, upon finding the equality, verification that the shared key at the other party is the same as the shared key at the first party and authenticating the first party.

6. The method as claimed in claim 1, wherein the step of updating the pre-shared information in static secret value mode at each of the party parties in the communication network comprise the steps of:
   extracting, by the first party, PSI information and reconstructing the shared key K such that K=s;
   extracting, by the other party, PSI information and reconstructing the shared key K such that K=s;
   dividing, by the first party, a secret value zero into 'n' number of shares $[w_1, \ldots, w_n]$ such that $w_i \neq$ '0' and n=2(k−1) where 'k' is the threshold number of shares required to reconstruct the secret information;
   dividing, by the other party, a secret value zero into 'n' number of shares $[q_1, \ldots, q_n]$ such that $q_i \neq$ '0' and n=2(k−1) where 'k' is the threshold number of shares required to reconstruct the secret information;
   encrypting, by the first party, by using the shared key K, a set of shares $w_k$ to $w_{2(k-1)}$ i.e. $[w_k, \ldots, w_{2(k-1)}]$ and communicating the same over an encrypted channel to the other party;
   encrypting, by the other party, by using the shared key K, a set of shares $q_1$ to $q_{k-1}$ i.e. $[q_1, \ldots, q_{(k-1)}]$ and communicating the same over the encrypted channel to the first party;
   updating, by the first party, the Pre-Shared Information for the first party, by obtaining a new set of shares $[z_1, \ldots, z_{k-1}]$ by decrypting the received encrypted set of shares $[q_1, \ldots, q_{(k-1)}]$ to get the set of shares $[q_1, \ldots, q_{(k-1)}]$ and adding shares $s_i$, $w_i$, and $q_i$ index-wise where i takes a value from 1 to (k−1) such that $[z_1, \ldots, z_{k-1}]$←$[(s_1+w_1+q_1), \ldots, (s_{k-1}+w_{k-1}+q_{k-1})]$, i=1, ..., k−1 and PSI=$[z_1, \ldots, z_{k-1}]$;
   updating, by the other devices, the Pre-Shared Information for the other devices, by obtaining a new set of shares $[z_k, \ldots, z_{2(k-1)}]$ by decrypting the received encrypted set of shares $[w_k, \ldots, w_{2(k-1)}]$ to get a set of shares $[w_k, \ldots, w_{2(k-1)}]$ and adding the shares $s_i$, $w_i$, and $q_i$ index-wise where i takes a value from k to 2(k−1) such that $[z_k, \ldots, z_{2(k-1)}]$←$[(s_k+w_k+q_k), \ldots, (s_{2(k-1)}+w_{2(k-1)}+q_{2(k-1)})]$, i=k, ..., 2(k−1) and PSI=$[z_k, \ldots, z_{2(k-1)}]$.

7. The method as claimed in claim 1, wherein the step of updating the pre-shared information in dynamic secret value mode at each of the parties in the communication network comprise the steps of:
   extracting, by the first party, PSI information and reconstructing the shared key K such that K=s;
   extracting, by the other party, PSI information and reconstructing the shared key K such that K=s;
   dividing by the first party, a secret random value '$r_1$' selected by the first party into 'n' number of shares $[w_1, \ldots, w_n]$ such that $w_i \neq$ '0' and n=2(k−1) where 'k' is the threshold number of shares required to reconstruct the secret information;
   dividing by the other party, a secret random value '$r_2$' selected by the other party into 'n' number of shares $[q_1, \ldots, q_n]$ such that $q_i \neq$ '0' and n=2(k−1) where 'k' is the threshold number of shares required to reconstruct the secret information;
   encrypting, by the first party, by using the shared key K, a set of shares $w_k$ to $w_n$ i.e. $[w_k, \ldots, w_n]$ and communicating the same over an encrypted channel to the other party;
   encrypting, by the other party, by using the shared key K, a set of shares $q_1$ to $q_{k-1}$ i.e. $[q_1, \ldots, q_{(k-1)}]$ and communicating the same over the encrypted channel to the first party;

updating, by the first party, the Pre-Shared Information for the first party, by obtaining a new set of shares $[z_1, \ldots, z_{k-1}]$ by decrypting the received encrypted set of shares $[q_1, \ldots, q_{(k-1)}]$ to get the set of shares $[q_1, \ldots, q_{(k-1)}]$ and adding shares $s_i$, $w_i$, and $q_i$ index-wise where i takes value from 1 to (k−1) such that $[z_1, \ldots, z_{k-1}] \leftarrow [(s_1+w_1+q_1), \ldots, (s_{k-1}+w_{k-1}+q_{k-1})]$, i=1, \ldots, k−1 and PSI=$[z_1, \ldots, z_{k-1}]$;

updating, by the other party, the Pre-Shared Information for the other party, by obtaining a new set of shares $[z_k, \ldots, z_n]$ by decrypting the received encrypted set of shares $[w_k, \ldots, w_n]$ to get the set of shares $[w_k, \ldots, w_n]$ and adding the shares $s_i$, $w_i$, and $q_i$ index-wise where i takes a value from k to n such that $[z_k, \ldots, z_n] \leftarrow [(s_k+w_k+q_k), \ldots, (s_n+w_n+q_n)]$, i=k, \ldots, n and PSI=$[z_k, \ldots, z_n]$; and reconstructing the newly obtained set of shares to get a completely new secret value.

8. A system for secure communication between two or more parties over a communication network comprises:
   a first device capable of communicating over the network, the first party comprises at least a first processor, at least one memory communicatively coupled to the first processor and at least one communication management module capable of managing transceiver activity and communicatively coupled to the first processor;
   at least one other device capable of communicating over the network, the other device comprises at least a second processor, at least one memory communicatively coupled to the second processor and at least one communication management module capable of managing transceiver activity and communicatively coupled to the second processor; and
   a network for facilitating a communication channel between the first device and the at least one other device;
   wherein, the first processor of the first party is configured to:
      communicate over the network a threshold number of shares 'k' required to reconstruct a secret information;
      communicate over the network a total number of shares 'n' in which an identity of the first device shall be divided such that n=2(k−1);
      establish an encryption/decryption key;
      receive the shares;
      establish, in broadcast mode or communication mode, a pre-shared information (PSI) at the first device;
      obtain a shared key by receiving an exchange key by the first device from the other device and reconstructing the shared key from the shares and exchange key received;
      verify the shared key by generating first hash values by applying a first hash function to a set consisting of the shared key and a random value at the first device, communicate the generated first hash value and the random value from the first device in communication to the other device, generate second hash values by applying a hash function to a set consisting of the shared key and a received random value from the other device and compare the first hash value with the received second hash value from other device; and
      update the pre-shared information at the first device in static secret value mode or dynamic secret value mode after each key agreement;

wherein, the second processor of the other device is configured to:
      communicate, over the network, a threshold number of shares 'k' required to reconstruct the secret information;
      communicate, over the network, the total number of shares 'n' in which an identity of other device shall be divided such that n=2(k−1);
      establish an encryption/decryption key;
      receive the shares;
      establish, in broadcast mode or communication mode, a pre-shared information (PSI) at the other device;
      obtain the shared key by receiving an exchange key by the other device from the first device and reconstructing the secret from the shares and exchange key received;
      verify the shared key, by generating third hash values by applying a third hash function to a set consisting of the shared key and a random value at the other device, communicate the generated third hash value and the random value from the other device to the first device, generate fourth hash values by applying a hash function to a set consisting of the shared key and a received random value from the first device and compare the third hash value with the received fourth hash value from the first device; and
      update the pre-shared information at the other device in static secret value mode or dynamic secret value mode after each key agreement.

9. The system as claimed in claim 8, the first processor, for establishing, in broadcast mode a pre-shared information (PSI) at the first device, configured to
   divide a secret 's' $(s \leftarrow f(I_A))$ into 'n' number of shares such that n=2(k−1) where 'k' is the threshold number of shares required to reconstruct the secret information;
   encrypt the shares from $s_k$ to $s_{2(k-1)}$ by using the encryption key $K_F$ to form an encrypted dataset/data packet $E_1$, $E_1 \leftarrow \text{Encrypt}([s_k, \ldots, s_{2(k-1)}], K_F)$;
   communicate the dataset/data packet $E_1$ from the first device to other devices in the network;
   establish the Pre-Shared Information for the first device by updating the PSI as set of $s_i$ where i takes values from 1 to (k−1) such that PSI=$[s_1, \ldots, s_{(k-1)}]$.

10. The system as claimed in claim 8, the second processor, for establishing, in broadcast mode a pre-shared information (PSI) at the other device, configured to
    decrypt the dataset/data packet $E_1$ received from the first device;
    establish the Pre-Shared Information for the other device by updating the PSI as set of $s_i$ where i takes values from k to 2(k−1) such that PSI=$[s_k, \ldots, s_{2(k-1)}]$.

11. The system as claimed in claim 8, the first processor, for establishing, in communication mode a pre-shared information (PSI) at the first device, configured to
    divide a secret 's' $(s \leftarrow f(I_A))$ into 'n' number of shares such that n=2(k−1) where 'k' is the threshold number of shares required to reconstruct the secret information;
    encrypt the shares from $s_k$ to $s_{2(k-1)}$ by using the encryption key Kr to form an encrypted dataset/data packet $E_1$, $E_1 \leftarrow \text{Encrypt}([s_k, \ldots, s_{2(k-1)}], K_F)$;
    communicate the dataset/data packet $E_1$ from the first device to other devices in the network;
    decrypt the dataset/data packet $E_2$ received from the other device by the first device;
    establish the Pre-Shared Information for the first device by updating the $s_i$ by generating $(s_i+p_i)$ where i takes values from 1 to (k−1) such that PSI=$[s_1, \ldots, s_{(k-1)}]$.

12. The system as claimed in claim 8, the second processor, for establishing, in communication mode a pre-shared information (PSI) at the other device, configured to
  divide a secret 'p' (p←f($I_B$)) into 'n' number of shares such that n=2(k−1) where 'k' is the threshold number of shares required to reconstruct the secret information;
  encrypt the shares from $p_1$ to $p_{(k-1)}$ by using the encryption key Kr to form an encrypted dataset/data packet $E_2$, $E_2$←Encrypt([$p_1$, . . . , $p_{(k-1)}$], $K_F$);
  communicate the dataset/data packet $E_2$ from the other devices in the communication network to the first device;
  decrypt the dataset/data packet $E_1$ received from the first device by the other devices;
  establish the Pre-Shared Information for the other device by updating the $s_i$ by generating ($s_i+p_i$) where i takes values from k to 2(k−1) such that PSI=[$s_k$, . . . , $s_{2(k-1)}$].

13. The system as claimed in claim 8, the first processor, for obtaining shared key at the first device, configured to
  collect all the shares from the established PSI for the first device;
  select randomly one of the shares of $s_i$ as an exchange key 'X' from $t_i$ values where i=1, . . . , k−1 and X←$s_i$, and communicate the same to the other device;
  determine a shared key $K_1$ by reconstructing the set of values of $t_i$ where i=1, . . . (k−1) and Y such that $K_1$←Reconstruct [$s_1$, . . . , $s_{k-1}$, Y] where $K_1$=s+p.

14. The system as claimed in claim 8, the second processor, for obtaining shared key at the other device, configured to
  collect all the shares from the established PSI for the other device;
  select randomly one of the shares of $s_j$ as an exchange key 'Y' from $s_j$ values where j=k, . . . , 2(k−1) and Y←$s_j$ and communicate the same to the first device;
  determine a shared key $K_2$ by reconstructing the set of values of $t_j$ where j=k, . . . 2(k−1) and X such that $K_2$←Reconstruct [$s_k$, . . . , $s_{2(k-1)}$, X] where $K_2$=s+p.

15. The system as claimed in claim 8, the first processor, for verifying shared key at the first device, configured to
  select a random value $R_1$ such that $R_1$←Random( );
  generate a hash value 'U' by applying a hash function to the set of the first device's shared key $K_1$ and the selected random value $R_1$ such that U←H($K_1$, $R_1$);
  communicate the generated hash value 'U' and the random value $R_1$ [U, $R_1$] to the other device;
  generate a hash value by applying a hash function to the set of the first device's shared key $K_1$ and the random value $R_2$ received from the other device, compare for equality a hash value with the hash value 'V' received from the other device, confirm, upon finding equality, verification that the shared key at the first device is the same as the shared key at the other device and authenticate the other device.

16. The system as claimed in claim 8, the second processor, for verifying shared key at the other device, configured to
  select a random value $R_2$ such that $R_2$←Random( );
  generate a hash value 'V' by applying a hash function to the set of the other device's shared key $K_2$ and the selected random value $R_2$ such that V←H($K_2$, $R_2$);
  communicate the generated hash value 'V' and the random value $R_2$ [V, $R_2$] to the first device in communication;
  generate hash value by applying hash function to the set of the other device's shared key $K_2$ and the random value $R_1$ received from the first device, compare for equality the resultant hash value with the hash value 'U' received from the first device, confirm, upon finding the equality, verification that the shared key at the other device is same as the shared key at the first device and authenticate the first device.

17. The system as claimed in claim 8, the first processor, for updating pre-shared information in static secret value mode at the first device, configured to
  extract respective PSI information and reconstruct the shared key K such that K=s;
  divide a secret value zero into 'n' number of shares [$w_1$, . . . , $w_n$] such that $w_i$≠'0' and n=2(k−1) where 'k' is the threshold number of shares required to reconstruct the secret information;
  encrypt by using the respective shared key K, the set of shares $w_k$ to $w_{2(k-1)}$ i.e. [$w_k$, . . . , $w_{2(k-1)}$] and communicate the same over an encrypted channel to the other devices in the network;
  update the Pre-Shared Information for the first device, by obtaining a new set of shares [$z_1$, . . . , $z_{k-1}$] by decrypting the received encrypted set of shares [$q_1$, . . . , $q_{(k-1)}$] to get the set of shares [$q_1$, . . . , $q_{(k-1)}$] and adding the shares $s_i$, $w_i$, and $q_i$ index-wise where i takes a value from 1 to (k−1) such that [$z_1$, . . . , $z_{k-1}$]←[($s_1+w_1+q_1$), . . . , ($s_{k-1}+w_{k-1}+q_{k-1}$)], i=1, . . . , k−1 and PSI=[$z_1$, . . . , $z_{k-1}$].

18. The system as claimed in claim 8, the second processor, for updating pre-shared information in static secret value mode at the other device, configured to
  extract respective PSI information and reconstruct the secret i.e. shared key K such that K=s;
  divide a secret value zero into 'n' number of shares [$q_1$, . . . , $q_n$] such that $q_i$≠'0' and n=2(k−1) where 'k' is the threshold number of shares required to reconstruct the secret information;
  encrypt by using the respective shared key K, the set of shares $q_1$ to $q_{k-1}$ i.e. [$q_1$, . . . , $q_{(k-1)}$] and communicate the same over an encrypted channel to the first device;
  update the Pre-Shared Information for the other devices in the network by obtaining a new set of shares [$z_k$, . . . , $z_{2(k-1)}$] by decrypting the received encrypted set of shares [$w_k$, . . . , $w_{2(k-1)}$] to get the set of shares [$w_k$, . . . , $w_{2(k-1)}$] and adding the shares $s_i$, $w_i$, and $q_i$ index-wise where i takes a value from k to 2(k−1) such that [$z_k$, . . . , $z_{2(k-1)}$]←[($s_k+w_k+q_k$), . . . , ($s_{2(k-1)}+w_{2(k-1)}+q_{2(k-1)}$)], i=k, . . . , 2(k−1) and PSI=[$z_k$, . . . , $z_{2(k-1)}$].

19. The system as claimed in claim 8, the first processor, for updating pre-shared information in dynamic secret value mode at the first device, configured to:
  extract respective PSI information and reconstruct the shared key K such that K=S;
  divide a secret random value '$r_1$' selected by the first device into 'n' number of shares [$w_1$, . . . , $w_n$] such that $w_i$≠'0' and n=2(k−1) where 'k' is the threshold number of shares required to reconstruct the secret information;
  encrypt by using the respective shared key K, the set of shares $w_k$ to $w_n$ i.e. [$w_k$, . . . , $w_n$] and communicate the same over encrypted channel to the other devices in the network;
  update the Pre-Shared Information for the first device, by obtaining a new set of shares [$z_1$, . . . , $z_{k-1}$] by decrypting the received encrypted set of shares [$q_1$, . . . , $q_{(k-1)}$] to get the set of shares [$q_1$, . . . , $q_{(k-1)}$] and adding the shares $s_i$, $w_i$, and $q_i$ index-wise where i takes a value from 1 to (k−1) such that [$z_1$, . . . , $z_{k-1}] \leftarrow [(s_1+w_1+q_1), \ldots, (s_{k-1}+w_{k-1}+q_{k-1})]$, $i=1, \ldots, k-1$ and PSI=$[z_1, \ldots, z_{k-1}]$;

reconstruct the newly obtained set of shares to get a new secret value.

20. The system as claimed in claim 8, the second processor, for updating pre-shared information in dynamic secret value mode at the other device, configured to:

extract respective PSI information and reconstructing the shared key K such that K=s;

divide a secret random value '$r_2$' selected by the other device into 'n' number of shares $[q_1, \ldots, q_n]$ such that $q_i \neq$ '0' and n=2 (k−1) where 'k' is the threshold number of shares required to reconstruct the secret information;

encrypt by using the respective shared key K, the set of shares $q_1$ to $q_{k-1}$ i.e. $[q_1, \ldots, q_{(k-1)}]$ and communicate the same over an encrypted channel to the first device;

update the Pre-Shared Information for the other devices in the network by obtaining a new set of shares $[z_k, \ldots, z_n]$ by decrypting the received encrypted set of shares $[w_k, \ldots, w_n]$ to get the set of shares $[w_k, \ldots, w_n]$ and adding the shares $s_i$, $w_i$, and $q_i$ index-wise where i takes a value from k to n such that $[z_k, \ldots, z_n] \leftarrow [(s_k+w_k+q_k), \ldots, (s_n+w_n+q_n)]$, $i=k, \ldots, n$ and PSI=$[z_k, z_n]$; and reconstruct the newly obtained set of shares to get a new secret value.

* * * * *